US009790328B2

(12) United States Patent
Mueller et al.

(10) Patent No.: US 9,790,328 B2
(45) Date of Patent: Oct. 17, 2017

(54) POLYETHERCARBONATE-POLYOXY-METHYLENE BLOCK COPOLYMERS

(71) Applicant: Covestro Deutschland AG, Leverkusen (DE)

(72) Inventors: Thomas Ernst Mueller, Aachen (DE); Christoph Guertler, Cologne (DE); Walter Leitner, Aachen (DE); Henning Vogt, Aachen (DE); Gabor Barath, Garching (DE); Mario Krautschick, Huckelhoven (DE)

(73) Assignee: Covestro Deutschland AG, Leverkusen (DE)

( * ) Notice: Subject to any disclaimer, the term of this patent is extended or adjusted under 35 U.S.C. 154(b) by 73 days.

(21) Appl. No.: 14/895,535

(22) PCT Filed: Jun. 10, 2014

(86) PCT No.: PCT/EP2014/061969
§ 371 (c)(1),
(2) Date: Dec. 3, 2015

(87) PCT Pub. No.: WO2014/198689
PCT Pub. Date: Dec. 18, 2014

(65) Prior Publication Data
US 2016/0130407 A1    May 12, 2016

(30) Foreign Application Priority Data

Jun. 13, 2013 (EP) .................................. 13171772

(51) Int. Cl.
| C08G 2/38 | (2006.01) |
| C08G 81/00 | (2006.01) |
| C08G 18/44 | (2006.01) |
| C08G 64/30 | (2006.01) |
| C08G 64/18 | (2006.01) |
| C08G 64/34 | (2006.01) |
| C08G 18/71 | (2006.01) |
| C08G 18/76 | (2006.01) |
| C08G 18/08 | (2006.01) |
| C08J 9/00 | (2006.01) |
| C08G 101/00 | (2006.01) |

(52) U.S. Cl.
CPC .............. C08G 81/00 (2013.01); C08G 2/38 (2013.01); C08G 18/14 (2013.01); C08G 18/44 (2013.01); C08G 18/71 (2013.01); C08G 18/7671 (2013.01); C08G 64/183 (2013.01); C08G 64/34 (2013.01); C08J 9/00 (2013.01); C08G 2101/0008 (2013.01); C08G 2101/0025 (2013.01)

(58) Field of Classification Search
CPC .......... C08G 81/00; C08G 2/38; C08G 18/14; C08G 18/44; C08G 18/7671; C08G 64/183; C08G 2101/008; C08G 2101/0025
See application file for complete search history.

(56) References Cited

U.S. PATENT DOCUMENTS

| 3,218,295 | A | 11/1965 | Edward |
| 3,404,109 | A | 10/1968 | Milgrom |
| 3,754,053 | A | 8/1973 | Kray et al. |
| 3,829,505 | A | 8/1974 | Johnston |
| 3,941,849 | A | 3/1976 | Herold |
| 4,352,914 | A | 10/1982 | Tobinaga |
| 5,158,922 | A | 10/1992 | Hinney et al. |
| 5,470,813 | A | 11/1995 | Le-Khac |
| 5,482,908 | A | 1/1996 | Le-Khac |
| 5,545,601 | A | 8/1996 | Le-Khac |
| 5,627,120 | A | 5/1997 | Le-Khac |
| 5,714,428 | A | 2/1998 | Le-Khac |
| 6,468,939 | B1 | 10/2002 | Ooms et al. |
| 6,780,813 | B1 | 8/2004 | Hofmann et al. |
| 6,835,687 | B2 | 12/2004 | Hofmann et al. |
| 7,001,959 | B2 | 2/2006 | Muck et al. |
| 7,378,559 | B2 | 5/2008 | Verwijs et al. |
| 8,946,466 | B2 | 2/2015 | Gurtler |
| 2002/0016395 | A1 | 2/2002 | Niino et al. |
| 2011/0218127 | A1* | 9/2011 | Allen ................ C08G 64/0208 507/219 |

FOREIGN PATENT DOCUMENTS

GB        1164997        11/1965

OTHER PUBLICATIONS

Inoue et al., "Copolymerization of Carbon Dioxide and Epoxide with Organometallic Compounds," Die Makromolekular Chemie, 1969, 130: 210-220 (abstract).

* cited by examiner

*Primary Examiner* — Kara Boyle
(74) *Attorney, Agent, or Firm* — Donald R. Palladino

(57) ABSTRACT

The present invention relates to a method for producing polyethercarbonate-polyoxymethylene block copolymers, comprising the step of polymerizing formaldehyde, wherein formaldehyde is polymerized in the presence of a polyethercarbonate having at least one Zerewitinoff-active H atom, obtaining an intermediate product. The obtained intermediate product can be further reacted with a cyclic carboxylic acid ester or carbonic acid ester, a cyclic anhydride, an epoxide, and/or an isocyanate, wherein a hydroxyl- or carboxy-functional or NCO-modified polyethercarbonate-polyoxymethylene block copolymer is obtained. The present invention further relates to polyethercarbonate-polyoxymethylene block copolymers that can be obtained by means of such a method and to the use of same to produce polyurethane polymers.

8 Claims, 1 Drawing Sheet

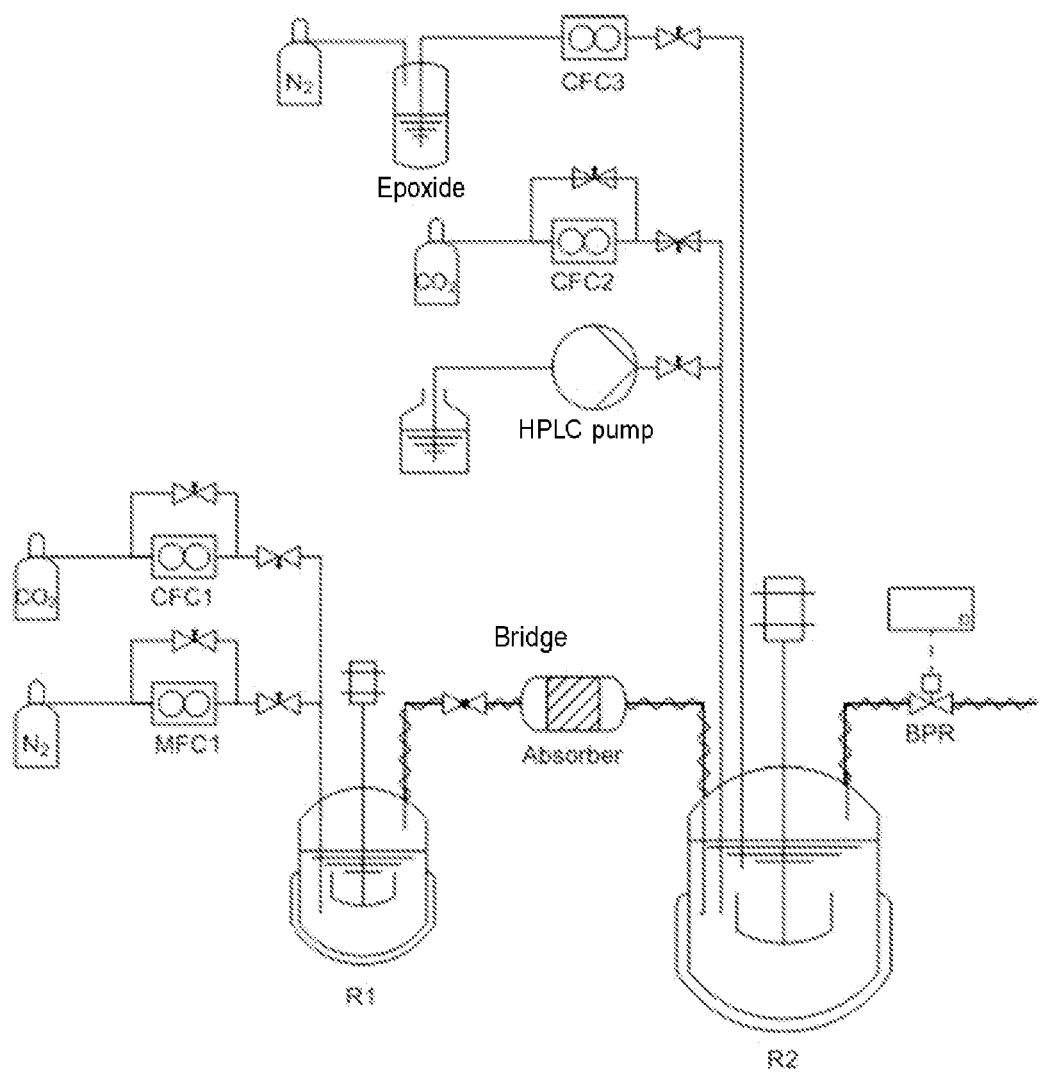

POLYETHERCARBONATE-POLYOXYMETHYLENE BLOCK COPOLYMERS

CROSS-REFERENCE TO RELATED APPLICATION

This Application is a National Phase Application of PCT/EP2014/061969, filed Jun. 10, 2014, which claims priority to European Application No. 13171772.0, filed Jun. 13, 2013, each of which being incorporated herein by reference.

FIELD

The present invention relates to a process for preparing polyethercarbonate-polyoxymethylene block copolymers, comprising the step of polymerizing formaldehyde in the presence of a polyethercarbonate having at least one Zerewitinoff-active hydrogen atom. The present invention further relates to polyethercarbonate-polyoxymethylene block copolymers obtainable by such a process and to the use thereof for preparing polyurethane polymers.

BACKGROUND

Block copolymers comprising polyoxymethylene units, in addition to other polymer and polycondensate units, are described for example in GB 807589, EP 1 418 190 A1, U.S. Pat. No. 3,754,053, US 2002/0016395, JP 04-306215, GB 1164997 and U.S. Pat. No. 4,352,914. The other polymer or polycondensate units present, in addition to polyoxymethylene units, comprise polyalkylene glycol units, in particular polytetramethylene glycol and polyethylene glycol units, also vinyl acetate-crotonic acid copolymers, methyl methacrylate-vinyloxyethylamine copolymers, vinyl acetate-allyl acetoacetate copolymers, vinyloxyethylamine-isobutyl methacrylate copolymers, dihydroxylated polybutadiene and difunctionalized polyethylene units.

Polyethercarbonates having at least one Zerewitinoff-active hydrogen atom can be prepared by catalytic reaction of alkylene oxides (epoxides) and carbon dioxide in the presence of H-functionalized starter substances ("starters") and has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl, arylalkyl or aryl, each of which may also contain heteroatoms, for example O, S, Si, etc., and where a, b, c and d are each integers and R may differ in different repeating units, and where the product shown here in scheme (I) for the polyethercarbonate should merely be understood in such a way that blocks having the structure shown may in principle be present in the polyethercarbonate obtained, but the sequence, number and length of the blocks and the OH functionality of the starter may vary, and is not restricted to the polyethercarbonate shown in scheme (I). This reaction (see scheme (I)) is environmentally very advantageous, since it constitutes the conversion of a greenhouse gas such as $CO_2$ to a polymer. A further product, actually a by-product, formed here is the cyclic carbonate shown in scheme (I) (for example, when R=$CH_3$, propylene carbonate).

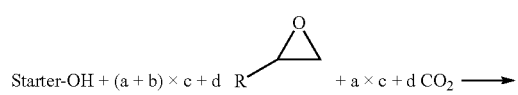
(I)

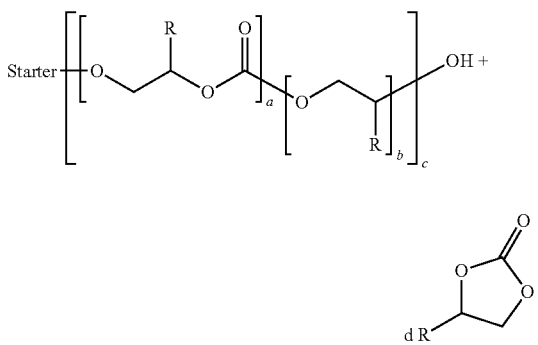

SUMMARY

Block copolymers comprising polyoxymethylene units in addition to polyethercarbonate units have not been described before.

The problem addressed was therefore that of providing polyethercarbonate-polyoxymethylene block copolymers, which react with isocyanates and can thus be used in the polyurethane sector.

This object was achieved according to the invention by a process for preparing polyethercarbonate-polyoxymethylene block copolymers, comprising the step of polymerizing formaldehyde, wherein formaldehyde is polymerized in the presence of a polyethercarbonate having at least one Zerewitinoff-active hydrogen atom. In this case, a polyethercarbonate-polyoxymethylene block copolymer is obtained.

BRIEF DESCRIPTION OF THE DRAWING

FIG. 1 is an illustration of a reactor arrangement suitable for carrying out the process of the invention.

DETAILED DESCRIPTION

It has been found, surprisingly, that the preparation of polyethercarbonate units from epoxides, carbon dioxide and a starter compound and the polymerization of formaldehyde can be carried out successively in the same reaction vessel without a prior purification of the polyethercarbonate intermediate being necessary.

The resulting polyethercarbonate-polyoxymethylene block copolymers offer a number of advantages over existing mono-, bi- or higher-functionality polymers. For instance, certain physical properties such as glass transition temperatures, melting ranges and/or viscosities can be specifically controlled via the length of the polyoxymethylene blocks and the polyethercarbonate blocks, the ratio of their respective length to each other and also the composition of the polyethercarbonate blocks, particularly the carbonate content thereof.

Compared to polyoxymethylene homopolymers of the same molecular weight, partial crystallinity in the polyethercarbonate-polyoxymethylene block copolymers according to the invention is typically lowered, which typically likewise leads to a lowering of glass transition temperatures, melting points and/or viscosities. The presence of the polyethercarbonate blocks additionally leads typically to an increase in the chemical and thermal stability. The thermal stability can be characterized, for example, by means of the decomposition temperature and/or the temperature-dependent relative weight loss. This may be determined, for example, by thermogravimetric analysis (TGA), as described in the experimental section. Thus, thermally more stable polymers are characterized by a relatively high decomposition temperature and/or a relatively low weight loss on heating to a certain temperature or a certain temperature range.

Polyoxymethylene homopolymers are typically restricted to a functionality F≤2. Via the use of polyethercarbonates having a functionality F≥2 (for example ≥3), in contrast, access to polyethercarbonate-polyoxymethylene block copolymers having a functionality F≥2 is possible.

Compared to polyether blocks of the same molecular weight, polyethercarbonate blocks have the advantage that the proportion of polyoxyalkylene units, prepared from the corresponding alkylene oxides, is reduced with respect to the carbonate proportion. This exchange of alkylene oxide units for carbon dioxide leads firstly to an advantageous energy balance and secondly to an increased proportion of renewable raw materials in the product. The incorporation of formaldehyde in the form of polyoxymethylene units leads to a further reduction of the proportion of alkylene oxide, which leads to an additional improvement in the energy balance of the product. Since formaldehyde can be obtained from renewable raw materials such as biomethanol or $CO_2$, the proportion of renewable raw materials in the product can thereby also be increased.

Polyethercarbonate-polyoxymethylene block copolymers (also referred to interchangeably as polyoxymethylene-polyethercarbonate block copolymers in the context of the invention) in the context of the invention refer to polymeric compounds comprising at least one polyoxymethylene block and at least one polyethercarbonate block.

A polyoxymethylene block in the context of the invention refers to a polymeric structural unit $(CH_2O)_x$ where $x \geq 1$, comprising at least one $CH_2$ group attached to two oxygen atoms, which is bonded via at least one of the oxygen atoms to further methylene groups or other polymeric structures. Polyoxymethylene blocks $(CH_2O)_x$ preferably comprise an average of $x \geq 1$ and $x \leq 500$, more preferably an average of $x \geq 1.1$ and $x \leq 150$ and particularly preferably an average of $x \geq 1.5$ and $x \leq 50$ oxymethylene units.

A polyethercarbonate block in the context of the invention refers to a polymeric structural unit $-O[(C_2R^1R^2R^3R^4O)_x(CO_2)(C_2R^1R^2R^3R^4O)_y]_z-$, where $x \geq 1$, $y \geq 0$ and $z \geq 1$, wherein $R^1$, $R^2$, $R^3$ and $R^4$ are each independently hydrogen, an alkyl or aryl residue optionally additionally comprising heteroatoms such as nitrogen, oxygen, silicon, sulfur or phosphorus and may differ in different repeating units. The term "alkyl" in the context of the overall invention generally comprises substituents from the group of n-alkyl such as methyl, ethyl or propyl, branched alkyl and/or cycloalkyl. The term "aryl" in the context of the overall invention generally comprises substituents from the group of mononuclear carbo- or heteroaryl substituents such as phenyl and/or polynuclear carbo- or heteroaryl substituents, which may optionally be substituted with further alkyl groups and/or heteroatoms such as nitrogen, oxygen, silicon, sulfur or phosphorus. The residues $R^1$, $R^2$, $R^3$ and/or $R^4$ may be linked to one another within a repeating unit such that they form cyclic structures, such as a cycloalkyl residue, which is incorporated into the polymer chain via two adjacent carbon atoms.

Various polyoxymethylene and/or polyethercarbonate blocks can be directly or indirectly linked to one another via spacers. The spacers present can be, for example, 1,3-propanediol, 1,4-butanediol, hexamethylenediol, 4-hydroxybutyric acid, 4-hydroxypentanoic acid, 6-hydroxyhexanoic acid, maleic acid, phthalic acid, glutaric acid, bisphenol A, bisphenol F, trimethylolpropane, glycerol, castor oil, pentaerythritol or sorbitol, each in their respective deprotonated form.

Formaldehyde can be used in the gaseous state, optionally as a mixture with inert gases, for example nitrogen or argon, or as a mixture with gaseous, supercritical or liquid carbon dioxide, or in the form of a formaldehyde solution. Formaldehyde solutions may be aqueous formaldehyde solutions having a formaldehyde content between 1% and 37% by weight, which may optionally contain up to 15% by weight of methanol as stabilizer. Alternatively, it is possible to use solutions of formaldehyde in polar organic solvents, for example methanol or higher mono- or polyhydric alcohols, 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another, or with water and/or other solvents. The presence of further substances in solution is likewise included as well. Preference is given to use of mixtures of gaseous formaldehyde with argon, nitrogen and/or carbon dioxide. Likewise preferred is the use of solutions of formaldehyde in aprotic polar organic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents.

Alternatively, formaldehyde can be generated in situ from a suitable formaldehyde source. Formaldehyde sources used may be substances which contain chemically bound formaldehyde, typically in the form of oxymethylene groups, and are capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, paraformaldehyde, high molecular weight polyoxymethylene (POM), dimethyl acetal, 1,3-dioxolane, 1,3-dioxane and/or 1,3-dioxepane, particular preference being given to 1,3,5-trioxane and paraformaldehyde.

The polyethercarbonates in the context of the invention are mono-, bi- or higher-functionality oligomeric or polymeric compounds, which can be formed, for example, from epoxides and carbon dioxide as starting materials, and comprise structural units $-O[(C_2R^1R^2R^3R^4O)_x(CO_2)(C_2R^1R^2R^3R^4O)_y]_z-$, where $x \geq 1$, $y \geq 0$ and $z \geq 1$ and $R^1$, $R^2$, $R^3$ and $R^4$ are each independently hydrogen, an alkyl or aryl residue optionally additionally comprising heteroatoms such as nitrogen, oxygen, silicon, sulfur or phosphorus and may differ in different repeating units. The residues $R^1$, $R^2$, $R^3$ and/or $R^4$ may optionally be linked to one another such that they form cyclic structures, such as a cycloalkyl residue, which is incorporated into the polymer chain via two adjacent carbon atoms. The polyethercarbonates in the context of the invention may comprise, in addition to the structural units $-O[(C_2R^1R^2R^3R^4O)_x(CO_2)(C_2R^1R^2R^3R^4O)_y]_z-$, further structural units which are used as starter compounds in the preparation of the polyethercarbonates. Such further structural units are, for example, bi- or higher-functionality alcohols such as ethylene glycol, diethylene glycol, propylene glycol, dipropylene glycol, glycerol, 1,3-propanediol, 1,4-butanediol, hexamethylenediol, bisphenol bisphenol F, trimethylolpropane, castor oil, pentaerythritol or sorbitol, di- or polycarboxylic acids such as maleic acid, phthalic acid, glutaric acid, hydroxycarboxylic acids such as 4-hydroxybutyric acid, 4-hydroxypentanoic acid, 6-hydroxyhexanoic acid, and also OH-terminated polyethers such as polyethylene glycol, polypropylene glycol, optionally in their respective deprotonated form. The polyethercarbonates are preferably prepared from the starting materials starter compound, epoxide and carbon dioxide.

The functionality of the polyethercarbonates is established via deprotonatable functional groups comprising heteroatoms and are terminal or arranged along the polymer chain, for example hydroxyl groups, thiol groups, amino groups, carboxylic acid groups or carboxylic acid derivatives, for example amides.

Solvents used may, for example, be water, methanol or higher mono- or polyhydric alcohols, nonpolar organic solvents, for example linear or branched alkanes or alkane mixtures, toluene, the various xylene isomers or mixtures thereof, mesitylene, mono- or polyhalogenated aromatics or alkanes such as chlorobenzene, dichlorobenzene, dichloromethane, dichloroethane or tetrachloroethane, open-chain or cyclic ethers, for example tetrahydrofuran (THF) or methyl tert-butyl ether (MTBE), open-chain or cyclic esters, or polar aprotic solvents, for example 1,4-dioxane, acetonitrile, N,N-dimethylformamide (DMF), N,N-dimethylacetamide, dimethyl sulfoxide (DMSO), cyclic carbonates, for example ethylene carbonate or propylene carbonate, N-methylpyrrolidone (NMP), sulfolane, tetramethylurea, N,N'-dimethylethyleneurea or mixtures thereof with one another, with water and/or with other solvents. It is also possible to use liquid or supercritical carbon dioxide as solvent in neat form or as a mixture with one of the abovementioned solvents. Preference is given to open-chain or cyclic ethers, for example tetrahydrofuran (THF) or methyl tert-butyl ether (MTBE), mono- or polychlorinated aromatics or alkanes such as chlorobenzene, dichlorobenzene, dichloromethane, dichloroethane or tetrachloroethane, open-chain or cyclic esters, polar aprotic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or with other solvents, and liquid or supercritical carbon dioxide. Particular preference is given to the reaction in the absence of solvents.

The reaction is effected by polymerization of formaldehyde in the presence of a polyethercarbonate having at least one Zerewitinoff-active hydrogen atom. The polyethercarbonate preferably has at least two Zerewitinoff-active hydrogen atoms. Examples of Zerewitinoff-active hydrogen atoms are those in OH, SH, primary or secondary amino groups. Hydrogen bonded to N, O or S is referred to as a Zerevitinov-active hydrogen (or as "active hydrogen") when it gives methane by reaction with methylmagnesium iodide by a process discovered by Zerevitinov.

The reaction can be conducted in a batchwise process, in a semi-batchwise process or in a continuous process. In the preferred semi-batchwise process, a polyethercarbonate, optionally in a mixture with a catalyst and/or a solvent, is initially charged, and formaldehyde or the formaldehyde source in neat form as a gas or liquid or in solution is metered into the reaction. The amount of formaldehyde or of formaldehyde equivalents present in the formaldehyde source which is metered in is chosen so as to attain the desired molecular weight.

In an alternative, likewise preferred continuous process, a polyethercarbonate, optionally in a mixture with a catalyst and/or a solvent, is initially charged, and formaldehyde or the formaldehyde source in neat form as a gas or liquid or in solution is metered into the reaction. On reaching the maximum fill level of the reactor, a portion of the reaction mixture is continuously removed, while polyethercarbonate and optionally catalyst and/or a solvent, and also formaldehyde or the formaldehyde source in neat form as a gas or liquid or in solution, is metered into the reaction. The ratios between the amount of polyethercarbonate and formaldehyde or of formaldehyde equivalents present in the formaldehyde source which is continuously metered in are chosen so as to attain the desired molecular weight.

The reaction is conducted, for example, at a temperature between 20 and 200° C., preferably between 20 and 120° C. and more preferably between 40 and 120° C. In the case of the use of a formaldehyde source comprising chemically bound formaldehyde, the reaction temperature is above the temperature required for release of formaldehyde, or incorporation thereof in the form of oxymethylene units, under the given conditions. In the presence of suitable catalysts which accelerate the release of formaldehyde or incorporation thereof, the reaction temperature may be below the temperature needed for the non-catalyzed release of formaldehyde or incorporation thereof. In some cases, the catalysts for the preparation of the polyethercarbonate-polyoxymethylene block copolymers according to the invention may likewise function as catalysts for the release of formaldehyde or incorporation thereof in the form of oxymethylene units.

The pressure during the polymerization of formaldehyde or the formaldehyde equivalents in the presence of the polyethercarbonate is generally 1 to 200 bar. In the case of use of gaseous formaldehyde, the pressure is preferably 3 to 100 bar, more preferably 5 to 50 bar.

The reaction time for the polymerization is, for example, 0.05 to 120 hours, preferably 0.5 to 48 hours, more preferably 1 to 24 hours. The reaction time is considered to be the period of time during which formaldehyde and polyethercarbonate and optionally catalyst are in direct contact at reaction temperature. Particularly in the case of performance in a semi-batchwise process, for example in the case of introduction of gaseous formaldehyde into the reaction mixture, the reaction time is guided by the amount of formaldehyde metered in, or of formaldehyde equivalents metered in, required to reach the desired molecular weight.

Embodiments of the process of the invention are described hereinafter. They can be combined with one another as desired, unless the opposite is clear from the context.

In one embodiment of the process according to the invention, the formaldehyde is polymerized also in the presence of a catalyst. The catalyst is preferably selected from the group of the basic catalysts and/or the Lewis-acid catalysts. Catalysts used are compounds which catalyze the polymerization of formaldehyde. Particular preference is given to Lewis-acid catalysts.

Examples of basic catalysts are tertiary or aromatic basic amines, for example triethylamine and other trialkylamines, pyridine and mono- or polysubstituted pyridine derivatives, N-alkyl- or N-arylimidazole, 1,4-diazabicyclo[2.2.2]octane (DABCO), 4-(dimethylamino)pyridine (DMAP), 1, 8-diazabicyclo[5.4.0]undec-7-ene (DBU), triazabicyclo[4.4.0]dec-5-ene (TBD) and 7-methyl-1,5,7-triazabicyclo[4.4.0]dec-5-ene (MTBD).

Lewis-acid catalysts comprise, as the Lewis-acidic center, one or more coordinatively unsaturated metal atoms, for example metals of the third, fourth or fifth main group, for example boron, aluminum, tin, antimony or bismuth, metals of the third and fourth transition group, for example scandium, yttrium, lanthanum, titanium, zirconium or hafnium and metals of the lanthanoid series, vanadium, molybdenum, tungsten, metals of the eighth, ninth or tenth transition groups, especially iron, cobalt, nickel, rhodium, iridium, palladium, platinum, copper or zinc. It is a feature of the coordinatively unsaturated Lewis-acidic center that nucleophilic molecules can bind thereto. The coordinatively unsaturated Lewis-acidic center may already be present in the compound used as catalyst or forms in the reaction mixture, for example as a result of elimination of a weakly bound nucleophilic molecule. Very particular preference is given to Lewis-acid catalysts comprising, as the Lewis-acidic center, one or more zinc, tin or molybdenum atoms, for example zinc di-2-ethylhexanoate, dibutyltin dilaurate (DBTL), dibutyltin oxide, tin di-2-ethylhexanoate or lithium molybdate. Very particular preference is also given to double metal cyanide catalysts (DMC catalysts) comprising zinc and cobalt as Lewis-acidic centers.

The catalyst is typically used in a molar ratio of 1:10 000 to 10:1, preferably 1:1000 to 1:1, more preferably 1:1000 to 1:10, relative to the functional groups present in the polyethercarbonate.

It is also possible to polmerize formaldehyde in the presence of a catalyst which is identical to the catalyst used for preparing the polyethercarbonate. In a specific embodiment, the catalyst used for preparing the polyethercarbonate-polyoxymethylene block copolymer is identical to the DMC catalyst used to prepare the polyethercarbonate.

In the process according to the invention, the polyoxymethylene units are linked to the polyethercarbonates either directly or indirectly via one or more comonomers or spacers. It is also possible for a plurality of polyoxymethylene units to be linked to one another via one or more comonomers. Therefore, in a further embodiment of the process according to the invention, the polymerization is additionally effected in the presence of a comonomer. Comonomers used may, for example, be cyclic ethers, especially epoxides, for example ethylene oxide, propylene oxide, cyclohexene oxide or styrene oxide, oxetane, THF, dioxane, cyclic acetals, for example 1,3-dioxolane or 1,3-dioxepane, cyclic esters, for example γ-butyrolactone, γ-valerolactone, ε-caprolactone, or cyclic acid anhydrides, for example maleic anhydride or phthalic anhydride, or mixtures of two or more of the abovementioned comonomers in any composition. Preferred comonomers are epoxides, cyclic acetals and cyclic esters; particularly preferred comonomers are ethylene oxide, propylene oxide, 1,3-dioxolane, 1,3-dioxepane and ε-caprolactone.

The metered addition of the comonomers can be effected in neat form or in solution. In an alternative embodiment, the metered addition of the comonomers is effected in a mixture with formaldehyde or the formaldehyde source. The metered addition of the comonomers can be effected prior to the metered addition, parallel to the metered addition or after the metered addition of formaldehyde or the formaldehyde source.

In a specific embodiment, the comonomers are at least in part identical to the epoxides used for preparing the polyethercarbonates.

In a further embodiment of the process of the invention, the formaldehyde is introduced into the reaction vessel in the form of gaseous formaldehyde.

In a specific embodiment, the polyethercarbonate used for preparing the polyethercarbonate-polyoxymethylene block copolymers is prepared by reaction of a starter compound having an active hydrogen atom with carbon dioxide and with at least one epoxide (alkylene oxide), wherein the reaction is carried out in the presence of a double metal cyanide catalyst (DMC catalyst) and wherein the crude product of this reaction, with the exception of a possible distillation step, undergoes no further purification.

The starter compounds having active hydrogen atoms used for preparing the polyethercarbonates (also referred to as H-functional starter substances) are preferably compounds having (number-average) molecular weights of ≥18 g/mol to 2000 g/mol, preferably ≥62 g/mol to ≤2000 g/mol and having a number of hydroxyl groups per molecule of ≥1 to ≤8, preferably ≥2 to ≤4. Examples of these are ethylene glycol, diethylene glycol, triethylene glycol, 1,2-propylene glycol, dipropylene glycol, 1,4-butanediol, hexamethylene glycol, bisphenol A, bisphenol F, trimethylolpropane, glycerol, castor oil, pentaerythritol, sorbitol, sucrose, degraded starch and/or water.

Particularly preferred H-functional starter substances (starter compounds) used are those compounds having number-average molecular weights of ≥450 g/mol to ≤2000 g/mol or a mixture composed of a) compounds having number-average molecular weights of ≥62 g/mol to ≤450 g/mol (also referred to below as "low molecular weight starter compounds") and b) compounds having number-average molecular weights of ≥450 g/mol to ≤2000 g/mol (also referred to below as "starter polyols"), which preferably comprise in each case ≥1 to ≤8, preferably ≥2 to ≤5 hydroxyl groups.

Examples of low molecular weight starter compounds are ethylene glycol, diethylene glycol, triethylene glycol, 1,2-propylene glycol, dipropylene glycol, 1,4-butanediol, hexamethylene glycol, bisphenol A, bisphenol F, trimethylolpropane, glycerol, castor oil, pentaerythritol, sorbitol and/or sucrose. Examples of starter polyols are, for example, polyether polyols, which were prepared from the abovementioned low molecular weight starter compounds and epoxides, or poly(oxyalkylene)carbonate polyols, which were prepared, for example, from the abovementioned starter compounds, epoxides and $CO_2$, wherein these starter polyols each have number-average molecular weights of ≥450 g/mol to ≤2000 g/mol.

The epoxide (alkylene oxide) used for preparing the polyethercarbonate compounds of the general formula (I) are:

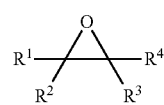

(I)

wherein $R^1$, $R^2$, $R^3$ and $R^4$ are each independently hydrogen or an alkyl or aryl residue optionally additionally comprising heteroatoms such as nitrogen, oxygen, silicon, sulfur or phosphorus and may optionally be linked to one another such that they form cyclic structures such as a cycloalkylene oxide for example.

It is also possible to use mixtures of various epoxides in the process according to the invention, provided that the constituents of the epoxide mixture all fall under the general formula (I). When using mixtures of different epoxides it is also possible to alter the mixing ratio of the epoxides during the metered addition in a stepwise or continuous manner. In general, for the method according to the invention, it is possible to use epoxides having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, phenyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane. The epoxide of the general formula (I) is preferably a terminal epoxide, wherein $R^1$, $R^2$ and $R^3$ are hydrogen, and $R^4$ may be hydrogen, an alkyl or aryl residue optionally additionally comprising heteroatoms such as nitrogen, oxygen, silicon, sulfur or phosphorus and may differ in different repeating units. The alkylene oxides particularly preferably used are ≥0% by weight to ≤30% by weight (based on the total amount of epoxide (I) used) of ethylene oxide and/or ≥30% by weight to ≤100% by weight (based on the total amount of epoxide (I) used) of propylene oxide, particular preference being given to using pure propylene oxide.

The double metal cyanide catalysts (DMC catalysts) suitable for preparing the polyethercarbonates are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity in the homopolymerization of epoxides and enable the preparation of polyether polyols at very low catalyst concentrations (25 ppm or lower), such that removal of the catalyst from the finished product is generally not required. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

It is also possible to use the alkaline DMC catalysts disclosed in EP application number 10163170.3.

To prepare the double metal cyanide compounds, suitable cyanide-free metal salts preferably have the general formula (II), $$M(X)_n \tag{II}$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X refers to one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n=1 when X=sulfate, carbonate or oxalate and n=2 when X=halide, hydroxide, cyanate, thiocyanate, isocyanate, isothiocyanate or nitrate, or suitable cyanide-free metal salts have the general formula (III), $$M_r(X)_3 \tag{III}$$

where

M is selected from the metal cations $Fe^{3+}$, $Al^{3+}$ and $Cr^{3+}$,

X refers to one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r=2 when X=sulfate, carbonate or oxalate and r=1 when X=halide, hydroxide, cyanate, thiocyanate, isocyanate, isothiocyanate, carboxylate or nitrate, or suitable cyanide-free metal salts have the general formula (IV), $$M(X)_s \tag{IV}$$

where

M is selected from the metal cations $Mo^{4+}$, $V^{4+}$ and $W^{4+}$,

X refers to one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s=2 when X=sulfate, carbonate or oxalate and s=4 when X=halide, hydroxide, cyanate, thiocyanate, isocyanate, isothiocyanate, carboxylate or nitrate, or suitable cyanide-free metal salts have the general formula (V), $$M(X)_t \tag{V}$$

where

M is selected from the metal cations $Mo^{6+}$ and $W^{6+}$,

X refers to one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t=3 when X=sulfate, carbonate or oxalate and t=6 when X=halide, hydroxide, cyanate, thiocyanate, isocyanate, isothiocyanate, carboxylate or nitrate, Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \tag{VI}$$

where

M' is selected from one or more metal cations from the group consisting of Fe(II), Fe(III), Co(II), Co(III), Cr(II), Cr(III), Mn(II), Mn(III), Ni(II), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Me^{2+}$, $Sr^{2+}$, $Ba^{2+}$), A is selected from one or more anions of the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, where the values of a, b and c are chosen so as to give electronic neutrality of the metal cyanide salt; a is preferably 1, 2, 3 or 4; b is preferably 4, 5 or 6; c preferably has a value of 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (VII)

$$M_x[M'_{x'}(CN)_y]_z \qquad (VII),$$

in which M is as defined in formula (II) to (V) and

M' is as defined in formula (VI), and x, x', y and z are integers and are chosen so as to give electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086. For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds, are used.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of cyanide-free metal salt to metal cyanide salt of 2.25:1.00), and the metal cyanide salt (e.g. potassium hexacyanocobaltate) are converted in the presence of the organic complex ligand (e.g. tert-butanol), such that a suspension is formed comprising the double metal cyanide compound (e.g. zinc hexacyanocobaltate), water, excess cyanide-free metal salt, and the organic complex ligands. This organic complex ligand may be present in the aqueous solution of the cyanide-free metal salt and/or of the metal cyanide salt, or it is added directly to the suspension obtained after precipitation of the double metal cyanide compound. It has been found to be advantageous to mix the aqueous solutions of the cyanide-free metal salt and of the metal cyanide salt and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described in WO-A 01/39883.

In the second step, the solid (i.e. the precursor of the inventive catalyst) is isolated from the suspension by known techniques, such as centrifugation or filtration.

In a preferred execution variant for preparing the catalyst, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the catalyst. Preferably, the amount of the organic complex ligand in the aqueous wash solution is between 40 and 80% by weight, based on the overall solution.

Optionally, in the third step, further complex-forming component is added to the aqueous wash solution, preferably in the range between 0.5 and 5% by weight, based on the overall solution.

Moreover, it is advantageous to wash the isolated solid more than once. For this purpose, the first washing procedure can be repeated. It is preferable, however, to use non-aqueous solutions for further washing operations, e.g. a mixture of organic complex ligands and other complex-forming components.

The isolated and optionally washed solid is subsequently, optionally after pulverization, dried at temperatures of generally 20-100° C. and at pressures of generally 0.1 mbar to standard pressure (1013 mbar).

A preferred process for isolating the DMC catalysts from the suspension by filtration, filtercake washing and drying is described in WO-A 01/80994.

The DMC catalyst may be used, for example, in a fraction of ≥1 ppm to ≤1000 ppm and preferably of ≥10 ppm to ≤500 ppm, based on the total mass of starter compound and epoxide (I) used.

To prepare the polyethercarbonates, one or more epoxides and carbon dioxide can be metered in simultaneously or sequentially, wherein the total amount of carbon dioxide can be added all at once or metered in over the reaction time. The carbon dioxide is preferably metered in. The metered addition of one or more epoxides is carried out simultaneously or sequentially to the metered addition of carbon dioxide. If more than two epoxides are used to synthesize the polyethercarbonates, the metered addition thereof can take place simultaneously or sequentially via separate metered additions in each case or via one or more metered additions, wherein at least two epoxides are metered in as a mixture. It is possible via the manner of the metered addition of the epoxides and the carbon dioxide to synthesize random, alternating, block or gradient polyethercarbonates. The concentration of free epoxides in the reaction mixture during the reaction is preferably >0 to ≤40% by weight, especially preferably >0 to ≤25% by weight, most preferably >0 to ≤15% by weight (based in each case on the weight of the reaction mixture).

Preferably, an excess of carbon dioxide is used, based on the calculated amount of carbon dioxide incorporated in the polyethercarbonate, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyethercarbonates has been found to be in the range from 0.01 to 120 bar, preferably 0.1 to 110 bar, more preferably from 1 to 100 bar. It has further been shown that the copolymerization for preparing the polyethercarbonates is advantageously conducted at 50 to 150° C., preferably at 60 to 145° C., more preferably at 70 to 140° C. and most preferably at 90 to 130° C. If temperatures below 50° C. are set, the reaction ceases. At temperatures above 150° C., the amount of unwanted by-products rises significantly. It is also to be noted that the $CO_2$, depending on the selection of pressure and temperature, converts from the gaseous state as far as possible to the liquid and/or supercritical fluid state. However, $CO_2$ can also be added to the reactor in solid form and then be converted under the selected reaction conditions to the liquid and/or supercritical fluid state.

In a further embodiment (also referred to below as "semi-batchwise mode") in the preparation of the polyethercarbonates, one or more starter polyols, carbon dioxide and the DMC catalyst are charged in the reactor system and one or more low molecular weight starter compounds are continuously fed in together with one or more alkylene oxides. In this case, the sum total of the amounts of starter polyols and low molecular weight starter compounds used corresponds to the total amount of starter compounds used. The metered addition of the low molecular weight starter compounds and the one or more alkylene oxides is preferably ended simultaneously, or the low molecular weight starter compounds and a first portion of one or more alkylene oxides are initially metered in simultaneously and subsequently the second portion of one or more alkylene oxides are metered in, wherein the sum total of the first and second portions of one or more alkylene oxides corresponds to the total amount of the amount of one or more alkylene oxides used. The first portion is 60 to 90% by weight and the second portion is 40 to 10% by weight of the total amount of alkylene oxide used. The amount of starter compounds which are metered continuously into the reactor during the preparation of the polyethercarbonate is preferably at least 20 mol % equivalents, more preferably 70 to 95 mol % equivalents (based in each case on the total amount of starter compounds).

After the metered addition of the feedstocks for preparing the polyethercarbonates, a post-reaction phase may follow in which the consumption of alkylene oxide may be quantified by monitoring the pressure. After reaching constant pressure, the polymerization with formaldehyde may be started (optionally after applying a vacuum or by stripping for removal of unreacted alkylene oxides), optionally after addition of a further catalyst.

For safety reasons in the preparation of the polyethercarbonates, the free epoxide (alkylene oxide) content in the reaction mixture in the stirred tank reactor should not exceed 15% by weight (see, for example, WO-A 2004/081082; page 3; line 14). In the preparation of the polyethercarbonates in the semi-batchwise mode and also in the continuous mode, the metering rate of the epoxide should therefore be appropriately adjusted such that the epoxide reacts sufficiently rapidly and, by means of the metered addition of epoxide, the free epoxide content in the reaction mixture in the stirred tank reactor does not exceed 15% by weight. It is possible to feed in the carbon dioxide continuously or discontinuously. The carbon dioxide pressure in the copolymerization may be varied. It is possible, during the addition of the epoxide, to increase or lower the $CO_2$ pressure gradually or to keep it constant. Some of the epoxide can also be added in the absence of $CO_2$, in order to construct a section of the corresponding copolymer from pure epoxide for example.

The preparation of the polyethercarbonates may precede activation steps (in the presence or absence of carbon dioxide) for activating the DMC catalyst used. When carrying out the copolymerization in a stirred tank reactor, the upstream step of activating the DMC catalyst can be carried out, for example, in the stirred tank reactor which is subsequently used for the copolymerization, or alternatively carried out in an upstream reactor which may itself in turn be a stirred tank reactor or tubular reactor.

The activation step of the DMC catalyst is referred to as a step in which a portion of the epoxide (I), optionally in the presence of $CO_2$, is added to the DMC catalyst and is then interrupted by addition of the epoxide, wherein a temperature hotspot and/or a pressure drop is observed in the reactor (when carried out in a stirred tank reactor) due to a subsequent exothermic chemical reaction. The process step of activation is the period from the addition of the portion of alkylene oxide compound, optionally in the presence of $CO_2$, to the DMC catalyst until the occurrence of the hotspot. In general, a step for drying the DMC catalyst and optionally the H-functional starter compound by increased temperature and/or reduced pressure can be upstream of the activation step, wherein this drying step is not part of the activation step in the context of the present invention.

In one embodiment of the process according to the invention, the starter compound used for the synthesis of the polyethercarbonates is a poly(oxyalkylene) polyol (i.e. a polyether polyol) or a poly(oxyalkylene)carbonate polyol (i.e. a product obtainable by copolymerization of carbon dioxide with epoxide starting from an H-functional starter compound), having in each case a mean functionality of ≥2.0 to ≤5.0 and a number-average molecular mass of ≥450 g/mol to ≤1000 g/mol. The mean functionality can also be ≥2.3 to ≤4.0. These poly(oxyalkylene) polyols and poly (oxyalkylene)carbonate polyols may also have an OH number of 200 mg KOH/g to ≤300 mg KOH/g. The OH number can be determined based on the standard DIN 53240.

In a further embodiment of the process according to the invention, in the epoxide of the general formula (I), $R^1$, $R^2$ and $R^3$ are hydrogen and $R^4$ is hydrogen, methyl, ethyl, n-propyl, isopropyl, n-butyl, sec-butyl, isobutyl, tert-butyl, cyclohexyl and/or phenyl. In this case, $R^4$ is preferably methyl. The epoxide used is then propylene oxide. Mixtures of propylene oxide and ethylene oxide are also used such that mixed polyether blocks are obtained. It is also possible to successively use more mixtures of propylene oxide and ethylene oxide with various mixing ratios.

In a further embodiment of the process according to the invention, the double metal cyanide catalyst comprises zinc, cobalt and tert-butanol. This catalyst preferably also comprises ≥5% by weight to ≤80% by weight, based on the amount of catalyst, of a polyether having a number-average molecular mass of ≥500 g/mol. The proportion of the polyether may also be ≥10% by weight to ≤70% by weight and particularly preferably ≥15% by weight to ≤60% by weight. Particularly suitable polyethers are, for example, polyether polyols having a mean OH functionality of 2 to 8 and a number-average molecular mass of ≥1000 g/mol to ≤10 000 g/mol and preferably of ≥1000 g/mol to ≤5000 g/mol. Examples include poly(oxypropylene) polyols, particularly diols and/or triols having a number-average molecular mass of ≥1000 g/mol to ≤4000 g/mol.

In a further embodiment, the polyethercarbonate used to prepare the polyethercarbonate-polyoxymethylene block copolymers (optionally directly) is prepared prior to the polymerization of the formaldehyde in the same reaction vessel and is reacted without purification steps (optionally excluding removal of volatile components by distillation).

The polyether carbonate used to prepare the polyether-carbonate-polyoxymethylene block copolymers is preferably prepared from the starting materials starter compound, epoxide and carbon dioxide.

In a further embodiment, the product mixture obtained in the preparation of the polyethercarbonate-polyoxymethylene block copolymers (optionally without further purification steps) is reacted with cyclic carboxylic and/or carbonic esters (to give hydroxy-functionalized polyethercarbonate-polyoxymethylene block copolymers). The further reaction can be effected directly in the present reactor (in situ) or in a second reactor without prior isolation of the polyethercarbonate-polyoxymethylene block copolymers. Alternatively, the reaction mixture can be used for the further reaction with a time delay, for example after transfer or storage. For the further reaction, preference is given to using product mixtures in which the polyethercarbonate-polyoxymethylene block copolymers have been obtained in the absence of solvents.

Examples of cyclic carbonic esters are cyclic carbonates of the formula (XI),

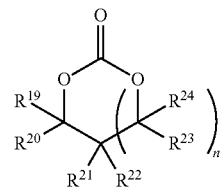

where,
$R^{19}$, $R^{20}$, $R^{21}$, $R^{22}$, $R^{23}$ and $R^{24}$ are each independently hydrogen, a linear or branched C1 to C22 alkyl radical optionally containing heteroatoms, a linear or branched, mono- or polyunsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered ring or polycyclic ring system optionally containing heteroatoms,
n is an integer greater than or equal to 0, preferably 0, 1, 2 or 3,
and $R^{23}$ and $R^{24}$ in repeating units (n>1) may each be different,
where the compounds of the formula (XI) may also be substituted by chlorine, bromine, nitro groups or alkoxy groups.

Preferred compounds of the formula (XI) are ethylene carbonate, propylene carbonate, butane-2,3-diol carbonate, pentane-2,3-diol carbonate, 2-methylpropane-1,2-diol carbonate, 2,3-dimethylbutane-2,3-diol carbonate, trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythrityl diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one, 5,5-dipropyl-1,3-dioxan-2-one.

Particular preference is given to propylene carbonate, trimethylene carbonate and neopentyl glycol carbonate.

In a specific embodiment, the cyclic carbonates are at least partly identical to the comonomers.

Examples of cyclic carboxylic esters are aliphatic or aromatic lactones comprising an ester bond in the ring, preferably compounds of the formulae (XII), (XIII) or (XIV),

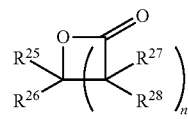

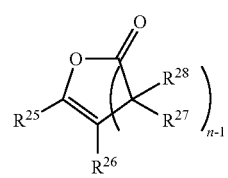

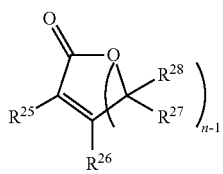

(XIV)

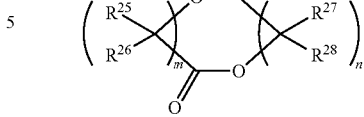

(XV)

where
R$^{25}$, R$^{26}$, R$^{27}$ and R$^{28}$ are each independently hydrogen, a linear or branched C1 to C22 alkyl radical optionally containing heteroatoms, a linear or branched, mono- or poly-unsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered or polycyclic system optionally containing heteroatoms, where the compounds of the formula (XII) may also be substituted by chlorine, bromine, nitro groups or alkoxy groups, n is an integer greater than or equal to 1, preferably 1, 2, 3 or 4, and R$^{27}$ and R$^{28}$ in repeating units (n>1) may each be different.

Preferred compounds of the formulae (XII), (XIII) or (XIV) are 4-membered ring lactones such as β-propiolactone, β-butyrolactone, β-isovalerolactone, β-caprolactone, β-isocaprolactone, β-methyl-β-valerolactone, 5-membered ring lactones such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered ring lactones such as δ-valerolactone, 1,4-dioxan-2-one, dihydrocoumarin, 1H-isochromen-1-one, 8H-pyrano[3,4-b]pyridine-8-one, 1,4-dihydro-3H-isochromen-3-one, 7,8-dihydro-5H-pyrano[4,3-b]pyridine-5-one, 4-methyl-3,4-dihydro-1H-pyrano[3,4-b]pyridine-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered ring lactones, such as ε-caprolactone, p-dioxanone and 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, ring lactones having higher numbers of members, such as (7E)-oxacycloheptadec-7-en-2-one.

Particular preference is given to ε-caprolactone and dihydrocoumarin.

In a specific embodiment, the aliphatic or aromatic lactones are at least partly identical to the comonomers.

Further examples of cyclic carboxylic esters are lactides containing two or more ester bonds in the ring, preferably compounds of the formula (XV)

where R$^{25}$, R$^{26}$, R$^{27}$, and R$^{28}$ are as defined above,
and m and n are each independently an integer greater than or equal to 1, preferably 1, 2, 3 or 4,
and R$^{25}$ and R$^{26}$ in repeating units (m>1) and R$^{27}$ and R$^{28}$ in repeating units (n>1) may each be different.

Preferred compounds of the formula (XV) are glycolide (1,4-dioxane-2,5-dione), L-lactide (L-3,6-dimethyl-1,4-dioxane-2,5-dione), D-lactide, DL-lactide, meso-lactide and 3-methyl-1,4-dioxane-2,5-dione, 3-methyl-6-(prop-2-en-1-yl)-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms).

Particular preference is given to L-lactide.

In a specific embodiment, the lactides are at least partly identical to the further comonomers.

In a further embodiment, the product mixture obtained in the preparation of the polyethercarbonate-polyoxymethylene block copolymers or after the further reaction with cyclic carboxylic or carbonic esters (optionally without further purification steps) is converted by reaction with cyclic anhydrides to give carboxylic acid-functionalized polyethercarbonate-polyoxymethylene block copolymers. The further reaction can be effected directly in the present reactor (in situ) or in a second reactor without prior isolation of the polyethercarbonate-polyoxymethylene block copolymers. Alternatively, the reaction mixture can be used for the further reaction with a time delay, for example after transfer or storage. For the further reaction, preference is given to using product mixtures in which the polyethercarbonate-polyoxymethylene block copolymers have been obtained in the absence of solvents.

Cyclic anhydrides used are preferably compounds of the formula (VIII), (IX) or (X),

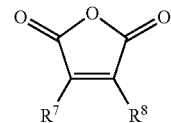

(VIII)

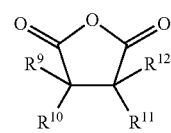

(IX)

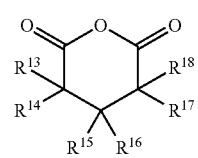

(X)

where
R$^7$ and R$^8$ are hydrogen, halogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or $R^7$ and $R^8$ may be members of a saturated or unsaturated 4- to 7-membered ring or polycyclic system optionally containing heteroatoms, and $R^7$ and $R^8$ together preferably form a benzene ring, $R^9$, $R^{10}$, $R^{11}$ and $R^{12}$ are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members of a saturated or unsaturated 4- to 7-membered ring or polycyclic system optionally containing heteroatoms and $R^{13}$, $R^{14}$, $R^{15}$, $R^{16}$, $R^{17}$ and $R^{18}$ are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members of a saturated or unsaturated 4- to 7-membered ring or polycyclic system optionally containing heteroatoms, wherein the compounds of the formula (VIII) and (IX) and (X) may also be substituted by chlorine, bromine, nitro groups or alkoxy groups.

Preferred compounds of the formula (VIII), (IX) or (X) are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, and allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide, 3[(2E)-but-2-en-1-yl]dihydrofuran-2,5-dione. Particular preference is given to succinic anhydride, maleic anhydride, glutaric anhydride and phthalic anhydride.

In a specific embodiment, the cyclic anhydrides are at least partly identical to the comonomers.

In a further embodiment, the product mixture obtained in the preparation of the polyethercarbonate-polyoxymethylene block copolymers or after the further reaction with cyclic carboxylic or carbonic esters and/or cyclic anhydrides (optionally without further purification steps) is converted by reaction with epoxides (preferably according to formula (I) described above) to give hydroxy-functionalized polyethercarbonate-polyoxymethylene block copolymers. In this manner, each of the block copolymers obtained (with or without additional end groups) may be reacted with epoxides. The further reaction can be effected directly in the present reactor (in situ) or in a second reactor without prior isolation of the polyethercarbonate-polyoxymethylene block copolymers. Alternatively, the reaction mixture can be used for the further reaction with a time delay, for example after transfer or storage. For the further reaction, preference is given to using product mixtures in which the polyethercarbonate-polyoxymethylene block copolymers have been obtained in the absence of solvents. For the further reaction with epoxides, further additives may be added to the mixture which, for example, catalyze the reaction of carboxyl groups with epoxides. Suitable additives are, for example, tetraalkylammonium halides $NR_4X$, wherein R is an alkyl radical and various substituents R may differ from one another, and X is a halide anion of the series fluorine, chlorine, bromine, iodine, amines, particularly tertiary amines such as triethylamine or DABCO, DMAP, DBU, TBD, MTBD, imidazole or N-alkylated imidazoles such as N-methylimidazole or trialkyl- or triarylphosphines, particularly triphenylphosphine.

In a further embodiment, the process further comprises the step of the reaction with isocynanates of the product mixture (optionally without further purification steps) obtained in the preparation of the polyethercarbonate-polyoxymethylene block copolymers or after the further reaction with carboxylic or carbonic esters and/or cyclic anhydrides and/or epoxides. The further reaction can be effected directly in the present reactor (in situ) or in a second reactor without prior isolation of the polyethercarbonate-polyoxymethylene block copolymers. Alternatively, the reaction mixture can be used for the further reaction with a time delay, for example after transfer or storage. For the further reaction, preference is given to using product mixtures in which the polyethercarbonate-polyoxymethylene block copolymers have been obtained in the absence of solvents.

In a further embodiment of the process according to the invention, the isocyanate is an aliphatic or aromatic di- or polyisocyanate and the resulting product is a polyurethane or a polyamide. Examples of aliphatic or aromatic di- or polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having $C_1$ to $C_6$-alkyl groups. Preference is given here to an isocyanate from the diphenylmethane diisocyanate series.

As well as the aforementioned polyisocyanates, it is also possible to additionally use proportions of modified diisocyanates having uretdione, isocyanurate, urethane, carbodiimide, uretonimine, allophanate, biuret, amide, iminooxadiazinedione and/or oxadiazinetrione structure, and also of unmodified polyisocyanate having more than 2 NCO groups per molecule, for example 4-isocyanatomethyl-1,8-octane diisocyanate (nonane triisocyanate) or triphenylmethane 4,4',4"-triisocyanate.

It is possible that the isocyanate is a prepolymer obtainable by reaction of an isocyanate having an NCO functionality of ≥2 and polyols having a molecular weight of ≥62 g/mol to ≤8000 g/mol and OH functionalities of ≥1.5 to ≤6.

In the case of preparation of the inventive polyethercarbonate-polyoxymethylene block copolymers in the presence of solvents, each further reaction step may be preceded by removal of the volatile components, for example by vacuum distillation. Additional purification steps such as extraction or precipitation, for example for removal of the catalyst, are likewise included.

Self-evidently, the invention relates to polyethercarbonate-polyoxymethylene block copolymers which can be prepared by a process according to the invention.

In one embodiment, the polyethercarbonate-polyoxymethylene block copolymers have a number-average molecular weight of ≤15 000 g/mol, preferably ≤7500 g/mol, more preferably ≤5000 g/mol. The number-average molecular weight can be determined, for example, by GPC against polypropylene glycol standards or, depending on the nature of the end group, via the OH number or acid number or NMR spectroscopy, as described in the experimental section.

In a further embodiment, the polyethercarbonate-polyoxymethylene block copolymers have a viscosity at 20° C. of ≤50 000 mPa·s, preferably of ≤20 000 mPa·s, more preferably of ≤5000 mPa·s. The determination of the viscosity is described in the experimental section.

The polyethercarbonate-polyoxymethylene block copolymers obtainable by the process according to the invention have a low content of by-products and can be processed without any problem, especially by reaction with chain extenders to give polyurethanes. For polyurethane applications, preference is given to using polyethercarbonate-polyoxymethylene block copolymers having a functionality of at least 2. In addition, the polyethercarbonate-polyoxymethylene block copolymers obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations.

The invention therefore likewise relates to the use of polyethercarbonate-polyoxymethylene block copolymers according to the invention for preparing polyurethane polymers. In one embodiment of said use, the polyurethane polymers are flexible polyurethane foams or rigid polyurethane foams. In a further embodiment of said use, the polyurethane polymers are thermoplastic polyurethane polymers.

Self-evidently, the present invention also relates to polyetherearbonate-polyoxymethylene block copolymers obtainable by a process according to the invention.

Also included in accordance with the invention is the use of functionalized polyoxymethylene block copolymers in accordance with the present invention for production of polyamides, polyurethanes, washing and cleaning composition formulations, drilling fluids, fuel additives, ionic and nonionic surfactants, lubricants, process chemicals for papermaking or textile production, or cosmetic formulations.

Examples

The invention is illustrated in more detail by the figures and examples which follow, but without being restricted thereto. The FIGURES show:

FIG. 1 a reactor arrangement for carrying out the process according to the invention Polyethercarbonates Used:

PEC-1: difunctional poly(oxypropylene)carbonate polyol (Desmophen 95LC01 from Bayer) having a nominal molecular weight of 2000 g/mol, a $CO_2$ content of 13.8% by weight and a nominal OH number of 56.3 $mg_{KOH}/g$. An OH number of 60.3 $mg_{KOH}/g$ was measured, giving a mean molecular weight M.W.=1857 g/mol. By gel permeation chromatography (GPC) against polystyrene standards, a number-average molecular weight $M_n$=3057 g/mol and a polydispersity index PDI=1.12 were determined. The deviation of the number-average molecular weight determined by GPC from the mean molecular weight determined by means of the OH number is due to interactions with the column material and also the use of calibration standards with a different structure (polystyrene) to PEC-1.

Starters Used for Synthesis of the Polyethercarbonates:

PET-1 difunctional poly(oxypropylene) polyol having an OH number of 109.6 $mg_{KOH}/g$, giving the mean molecular weight M.W.=1022 g/mol and the average empirical formula $HO(CH(CH_3)CH_2)_{17.02}H$. By GPC against polystyrene standards, a number-average molecular weight $M_n$=1564 g/mol and a polydispersity index PDI=1.09 were measured. The deviation of the number-average molecular weight determined by GPC from the mean molecular weight determined by means of the OH number is due to the use of calibration standards with a different structure (polystyrene) to PET-1.

The DMC catalyst was prepared according to example 6 of WO-A 01/80994.

Isocyanates Used:

Isocyanate 1 having an average functionality of 2.6 and an NCO value of 31.1-31.1%, containing 42.4% 4,4'-MDI, 12.6% 2,4'-MDI, 2.2% 2,2'-MDI (Desmodur VP PU 0325 from Bayer).

The formaldehyde source used was paraformaldehyde (CAS [30525-89-4]) from Aldrich (catalog number 16005, Lot# SZBB0250V).

Description of the Methods:

Gel permeation chromatography (GPC): The measurements were performed on an Agilent 1200 Series (G1310A Iso Pump, G1329A ALS, G1316A TCC, G1362A RID, G1365D MWD) from Agilent, detection by RID; eluent: chloroform (GPC grade), flow rate 1.0 ml/min; column combination: PSS SDV precolumn 8×50 mm (5 μm), 2×PSS SDV linear S 8×300 ml (5 μm). Polystyrene samples of known molar mass from PSS Polymer Standards Service were used for calibration. The measurement recording and evaluation software used was the software package "PSS WinGPC Unity". The GPC chromatograms were recorded in accordance with DIN 55672-1.

$^1H$ NMR spectroscopy: The measurements were effected on a Bruker AV400 instrument (400 MHz); the chemical shifts were calibrated relative to trimethylsilane as internal standard (δ=0.00 ppm) or to the solvent signal ($CDCl_3$, δ=7.26 ppm); s=singlet, m=multiplet, bs=broad singlet, kb=complex region. The data for the size of the area integrals of the signals were reported relative to one another.

The relative proportion $n_i$ of the individual structural units i is calculated using the integrals $I_i$ according to:

$n_{PEC}=I_{PEC-CH3}/3$ $n_{PE}=\Sigma I_{PE-CH3}/3$ $n_{cPC}=I_{cPC-CH3}/3$ $n_{CH2O}=\Sigma I_{CH2O}/2=[\Sigma I_{CH2O/PEC-CH/cPC-CH}-(I_{PEC-CH3}/3)-(I_{cPC}/3)]/2$ (The signals for CH2O, PEC-CH and cPC-CH partially overlap. For this reason, all area integrals of these signals are summed and corrected for the PEC-CH and/or cPC-CH fraction).

$n_{Gt}=I_{Gt-C(O)CH2}/4$ $n_{TC}=I_{TC-CH3}/3$, where PEC represents a polyethercarbonate unit —($CH_2CH(CH_3)OCOO$)—, PEC-$CH_3$ represents the $CH_3$ group contained therein and PEC-CH represents the CH group contained therein, PE represents a polyether unit —(CH$_2$CH(CH$_3$)O)—, which is not attached to a carbonate unit, and PE-CH$_3$ represents the CH$_3$ group contained therein, cPC represents cyclic propylene carbonate and cPC-CH$_3$ represents the CH$_3$ group contained therein, CH$_2$O is an oxymethylene unit, Gt represents a glutarate unit —OC(O)CH$_2$CH$_2$CH$_2$C(O)OH and Gt-C(O)CH$_2$ represents the methylene groups which are bonded directly to a carboxyl group therein and TC represents a 4-tolyl carbamate unit —CONH(C$_6$H$_4$)CH$_3$ and TC-CH3 represents the CH$_3$ group contained therein.

After normalizing to 2 end groups EG (EG=Gt or TC) per molecule, the average empirical formula is

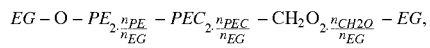

$$EG-O-PE_{2 \cdot \frac{n_{PE}}{n_{EG}}} - PEC_{2 \cdot \frac{n_{PEC}}{n_{EG}}} - CH_2O_{2 \cdot \frac{n_{CH2O}}{n_{EG}}} - EG,$$

where EG represents an end group, i.e. Gt or TC.

In the case of absence of Gt or TC as end group (e.g. Example 6 and 7), the average empirical formula for bihydroxy-functional polyethercarbonate-polyoxymethylene block copolymers can be calculated using the mean molecular weight M.W. determined by means of the OH number according to:

$f \cdot (n_{PE} \cdot 58.08$ g/mol$+n_{PEC} \cdot 102.08$ g/mol$+n_{CH2O} \cdot 30.03$ g/mol$)+18.02$ g/mol=M.W.

$$f = \frac{M \cdot W \cdot - 18.02 \text{ g/mol}}{n_{PE} \cdot 58.08 \text{ g/mol} + n_{PEC} \cdot 102.08 \text{ g/mol} + n_{CH2O} \cdot 30.03 \text{ g/mol}}$$

Multiplication of the resulting factor f with the relative proportions n$_i$ (i=PE, PEC, CH$_2$O) gives the average number x$_i$ of the units i in the average empirical formula HO-PE$_{xPE}$-PEC$_{xPEC\text{-}CH2}$O$_{xCH2O}$—H.

$^{13}$C NMR spectroscopy: The measurements were effected on a Bruker AV400 instrument (100 MHz); the chemical shifts were calibrated relative to trimethylsilane as internal standard (δ=0.00 ppm) or to the solvent signal (CDCl$_3$, δ=77.16 ppm); APT (attached proton test): CH$_2$, C$_{quart}$: positive signal (+); CH, CH$_3$: negative signal (−); HMBC: Hetero multiple bond correlation; HSQC: Heteronuclear single-quantum correlation.

Infrared (IR) spectroscopy: The measurements were effected on the Bruker Alpha-P FT-IR spectrometer; the measurements were effected neat; signal intensities: vs=very strong, s=strong, m=medium, w=weak, vw=very weak; b=broad band.

Electrospray mass spectrometry (ESI-MS): The measurements were effected on the Thermo Fisher Scientific LTQ Orbitrap XL instrument; samples were diluted with MeOH.

The OH number (hydroxyl number) was determined on the basis of DIN 53240-2, except using N-methylpyrrolidone rather than THF/dichloromethane as the solvent. A 0.5 molar ethanolic KOH solution was used for titration (endpoint recognition by means of potentiometry). The test substance used was castor oil with certified OH number. The reporting of the unit in "mg$_{KOH}$/g" relates to mg[KOH]/g [polyol]. The average molecular weight M.W. is calculated from the OH number according to M.W.=(56 g/mol/OH number)*1000 mg/g*F, where F is the mean OH functionality, which is defined by the OH functionality of the starter molecule.

The acid number was determined in accordance with (DIN EN ISO 2114), except that titration was effected with a 0.5 molar methanolic potassium hydroxide solution rather than an ethanolic potassium hydroxide solution. The endpoint was recognized by means of potentiometry. The reporting of the unit in "mg$_{KOH}$/g" relates to mg[KOH]/g [polyacid]. The average molecular weight M.W. is calculated from the acid number according to M.W.=(56 g/mol/acid number)*1000 mg/g*F, where F is the mean acid functionality, which is defined by the OH functionality of the starter molecule.

The viscosity was determined on an Anton Paar Physica MCR 501 rheometer. A cone-plate configuration having a separation of 50 µm was selected (DCP25 measurement system). 0.1 g of the substance was applied to the rheometer plate and subjected to a shear of 0.01 to 1000 1/s at 25° C., and the viscosity was measured every 10 s for 10 min. The viscosity averaged over all the measurement points is reported.

TGA (Thermogravimetric analyses) were carried out using a TGA/DSC 1 instrument from Mettler Toledo. Between 6 and 20 mg of the sample to be measured were heated from 25° C. to 600° C. at a heating rate of 10 K/min and the relative weight loss was determined as a function of the temperature. The evaluation software used was STAR$^e$ SW 11.00. To determine the various decomposition stages, a tangential evaluation method was applied unless otherwise stated. The "midpoint" is given as the decomposition temperature.

An experimental apparatus was used for the reactions which consisted of a 970 ml stainless steel autoclave ("depolymerization reactor" R1) and a 1700 ml stainless steel autoclave ("polymerization reactor" R2), which were linked to each other via a heatable bridge, which could be shut off by means of a valve, for transferring the formaldehyde gas generated in R1. The bridge consisted of two heatable ¼-inch capillaries linked via a heatable 200 ml stainless steel container, which had been filled with 100 g of anhydrous A3 molecular sieves as water absorber. Both reactors were equipped with a hollow shaft stirrer and manometer and were heatable independently of one another. The gas supply to R1 was via an immersed tube. The metering rate ṁ$_{in,R1}$ was regulated with a mass flow regulator (MFC 1, capacity: 6 l/min, for argon or nitrogen as carrier gas) or a Coriolis flow regulator (CFC1, capacity: 700 g/h, for CO$_2$ as carrier gas). The gas stream enriched with formaldehyde was passed through the bridge from R1 to R2. R2 had an additional gas supply for CO$_2$, of which the metering rate ṁ$_{CFC2}$ was regulated via a separate Coriolis flow regulator (CFC2, capacity: 700 g/min). In addition, R2 had a liquid inlet via which the epoxide was metered in. The epoxide was metered in by applying nitrogen gas to the epoxide storage vessel under a pressure which was at least 10 bar above the reaction pressure p, wherein the mass flow ṁ$_{CDC3}$ was regulated by a Coriolis flow regulator (CFC3, capacity: 200 g/min). A third inlet allowed the metered addition of further liquid reagents via an HPLC pump. A heatable ¼-inch capillary was located on R2 as gas outlet, which was provided with a heatable back pressure regulator (BPR) which ensured a constant pressure p in the reactor system.

The pressure reactors used in the examples had a height (internal) of 21 cm (R1) or 15 cm (R2) and an internal diameter of 10 cm (R1 and R2). The reactors were equipped with an electrical heating jacket (maximum heating power 150 watts). In addition, the reactors were equipped with an inlet tube, and each was equipped with a thermal sensor of diameter 6 mm which projected into the reactor up to 60 mm above the base.

The hollow shaft stirrer used in the examples was a hollow shaft stirrer in which the gas was introduced into the reaction mixture via a hollow shaft in the stirrer. The stirrer body mounted on the hollow shaft had four arms and had a diameter of 50 mm and a height of 19 mm. At each end of the arm was mounted a gas outlet which had a diameter of 3 mm. The rotation of the stirrer gave rise to a reduced pressure such that the gas present above the reaction mixture ($CO_2$ and/or argon or nitrogen and possibly formaldehyde) was sucked in and introduced through the hollow shaft of the stirrer into the reaction mixture.

Example 1: Preparation of a Poly(Oxypropylene)Carbonate-Polyoxymethylene Block Copolymer and Reaction with 4-Tolyl Isocyanate R1 was charged with 60.61 g (2.02 mol) of paraformaldehyde, 1.60 g (4.9 mmol) of 4-dodecylbenzenesulfonic acid, 1.34 g (4.7 mmol) of phosphorus pentoxide and 60 ml of undecane. The mixture was stirred at 50 rpm. R2 was charged with 50.90 g of PEC-1 (25.5 mmol) and 0.41 g (0.65 mmol) of dibutyltin dilaurate (DBTL) and the mixture was stirred at 400 rpm. The nominal pressure of the BPR was set to p=20 bar and the whole system was pressurized with $CO_2$ via CFC1 up to the nominal pressure with bridge open. After reaching the nominal pressure, $\dot{m}_{in,R1}$ was set to 300 g/h and the system pressure and $\dot{m}_{in,R1}$ were kept constant over the reaction time. The bridge before the absorber was heated to 140° C. while absorber and connecting line to R2 was heated to 120° C. The interior space of R2 and the gas outlet capillary were heated to 60° C. and the BPR was heated to 140° C. After reaching the nominal temperatures for bridge, R2, gas outlet and BPR, the interior space of R1 was heated to 125° C. and gaseous formaldehyde was introduced into R2 over 7 h. $\dot{m}_{in,R1}$ was then set to 0 g/h, the bridge was shut off and R1 and R2 were cooled to 25° C. A solution of 8.6 g (0.064 mol) of 4-tolyl isocyanate in 25 ml of dichloromethane was then introduced into R2 with stirring at a flow rate of 5 ml/min via the HPLC pump. The reaction mixture in R2 was then stirred at 400 rpm at 25° C. for 18 h. Subsequently, the positive pressure was released via the BPR and the reaction vessel was opened. A colorless, viscous oil with colorless solid particles was found in R2. The increase in weight in R2 during the reaction was 52.11 g. Deducting the mass of 4-tolyl isocyanate and dichloromethane added, this corresponds to a transfer of 10.26 g (0.342 mol) of formaldehyde. The product was diluted with 100 ml of chloroform and filtered through a paper filter. After the volatile components of the filtrate had been removed under reduced pressure, 44.04 g of a clear, colorless oil were obtained.

Viscosity: 2.24 Pa·s

Two decomposition stages were identified by thermogravimetric analysis (TGA):

stage 1: decomposition temperature 144.83° C., relative weight loss 11.06%.

stage 2: decomposition temperature 341.54° C., relative weight loss 79.64%.

By gel permeation chromatography (GPC) against polystyrene standards, a number-average molecular weight $M_n$=2956 g/mol and a polydispersity index PDI=1.12 were determined.

The apparent decrease of the number-average molecular weight compared to PEC-1 is due to the altered interaction of the product with the column material and does not correspond to an actual decrease of the average molecular weight, as was shown by $^1$H-NMR spectroscopy.

$^1$H-NMR spectroscopy (400 MHz, $CDCl_3$): δ=0.82-0.92 (m, 7.14H), 1.04-1.20 (m, 97.36H, PE-$CH_3$), 1.21-1.35 (m, 25.96H, PEC-$CH_3$), 2.19-2.38 (m, 6.00H, TC-$CH_3$), 3.18-4.31 (m, 116.70H, PE-CH/PE-$CH_2$/PEC-$CH_2$), 4.69-5.05 (m, 32.93H, $OCH_2$O/PEC-CH), 5.11-5.48 (m, 7.81H, $OCH_2$O), 6.87-7.26 (m, 10.05H, TC-$CH_{ar}$) ppm.

The average empirical formula according to $^1$H-NMR spectroscopy is TC-O-$PE_{32.45}$-$PEC_{8.65}$-$(CH_2O)_{16.05}$-TC. The product therefore comprises an average of 16.05 oxymethylene groups per molecule.

The average molecular weight according to $^1$H-NMR spectroscopy is 3534 g/mol.

$^{13}$C-APT-NMR spectroscopy (100 MHz, $CDCl_3$): δ=13.7 (–), 14.7 (–), 15.7 (–), 16.2 (–), 16.8 (–), 19.9 (–, tol-$CH_3$), 20.3 (–, tol-$CH_3$), 22.2 (+), 28.9 (+), 29.2 (+), 31.4 (+), 62.2 (+), 63.0 (+), 69.8 (+), 69.9 (+), 70.8 (+), 70.9 (+), 71.2 (+), 71.3 (+), 72.5 (+), 72.9 (+), 73.1 (+), 73.3 (–), 73.5 (–), 74.5 (–), 74.6 (–), 74.7 (–), 74.9 (–), 75.0 (–), 75.2 (–), 75.3 (–), 77.3 (–), 82.1 (+, O—$CH_2$—O), 85.4 (+, O—$CH_2$—O), 85.6 (+, O—$CH_2$—O), 86.0 (+, O—$CH_2$—O), 88.3 (+, O—$CH_2$—O), 86.1 (+, O—$CH_2$—O), 87.5 (+, O—$CH_2$—O), 87.6 (+, O—$CH_2$—O), 87.9 (+, O—$CH_2$—O), 88.1 (+, O—$CH_2$—O), 88.6 (+, O—$CH_2$—O), 90.1 (+, O—$CH_2$—O), 90.3 (+, O—$CH_2$—O), 91.0 (+, O—$CH_2$—O), 91.4 (+, O—$CH_2$—O), 91.5 (+, O—$CH_2$—O), 91.7 (+, O—$CH_2$—O), 93.0 (+, O—$CH_2$—O), 94.5 (+, O—$CH_2$—O), 114.2 (–, TC-$CH_{ar}$), 114.3 (–, TC-$CH_{ar}$), 118.5 (–, TC-$CH_{ar}$), 120.5 (–, TC-$CH_{ar}$), 128.9 (–, TC-$CH_{ar}$), 129.2 (–, TC-$CH_{ar}$), 131.7 (+), 130.7 (+), 132.2 (+), 135.1 (+, TC-C—NH—), 145.8 (+, TC-NH—C(O)—O), 152.2 (+, TC-NH—C(O)—O), 153.8-154.3 (+, TC-NH—C(O)—O) ppm.

The occurrence of a multitude of signals in the $^1$H NMR spectrum in the range of 4.7 to 5.5 ppm, and a multitude of signals having positive polarity in the $^{13}$C APT NMR spectrum in the range of 82.1 to 94.5 ppm, shows the presence of chemically nonequivalent oxymethylene groups in $(CH_2O)_n$ blocks having different chain lengths.

IR spectroscopy: ν=3349 (b, vw, ν[NH]), 2971 (w), 2925 (w), 2870 (w), 1742 (m, ν[C=O]), 1617 (vw), 1600 (vw), 1522 (w), 1452 (w), 1374 (w), 1347 (vw), 1315 (vw), 1255 (s), 1160 (w), 1096 (s), 1014 (w), 968 (w), 928 (w), 854 (vw), 817 (w), 790 (w), 754 (w), 665 (vw), 511 (vw) $cm^{-1}$.

The IR spectrum is neither identical to the IR spectrum of paraformaldehyde nor to the IR spectrum of PEC-1. The NH— and C=O— stretch vibrations can be attributed to carbamate units. The occurrence of these bands demonstrates that the reaction of the terminal OH groups with tolyl isocyanate was successful. The absence of an NCO band at 2261 $cm^{-1}$ shows that no free 4-tolyl isocyanate is present in the product. The occurrence of a new band at 968 $cm^{-1}$ indicates the presence of oxymethylene groups. Inventive Example 1 verifies the preparation of a poly(oxypropylene) carbonate-polyoxymethylene block copolymer and subsequent reaction of the functional hydroxyl groups with an isocyanate.

Example 2: Preparation of a Poly(Oxypropylene)Carbonate Diol and Conversion to a Bicarboxy-Functional Poly(Oxypropylene)Carbonate-Polyoxymethylene Block Copolymer R1 was charged with 180.33 g (6.011 mol) of paraformaldehyde, 4.18 g (0.013 mol) of 4-dodecylbenzenesulfonic acid, 3.2 g (0.011 mol) of phosphorus pentoxide and 100.05 g of paraffin. R2 was charged with 248.5 g of PET-1 and 0.105 g of DMC catalyst (8322 PCA). The BPR was set to a nominal pressure of 1 bar and the reactor was purged for 10 min with argon with gas outlet open. R2 was then evacuated at 50 mbar pump vacuum using a diaphragm pump and the reactor was heated to an internal temperature of 130° C. After reaching the temperature, the evacuation was continued for 30 min. The link to the vacuum pump was then interrupted, the BPR set to 20 bar and R2 was charged with $CO_2$ at $\dot{m}_{CFC2}$=500 g/h until this value was reached. 3 pulses of 25 g (0.43 mol) of propylene oxide were then introduced into R2 at $\dot{m}_{CFC3}$=60 g/h with stirring at 700 rpm, in which case, after each pulse, the drop in pressure was compensated for by metered addition of $CO_2$, and, prior to each further addition of propylene oxide, there was a waiting period until no further pressure drop was observed. After the reaction of the third propylene oxide pulse had subsided (no further drop in pressure observed), the pressure in R2 was adjusted with $CO_2$ to 20 bar and in total 100 g (1.72 mol) of propylene oxide at $\dot{m}_{CFC3}$=60 g/h were metered in with stirring at 700 rpm. After completion of the addition, R1 was pressurized with 20.5 bar $CO_2$ and the bridge between R1 and R2 was opened. The mass flow $\dot{m}_{in,R1}$ ($CO_2$) was adjusted to 300 g/h. The bridge before the absorber was heated to 140° C. while absorber and connecting line to R2 were heated to 120° C., gas outlet capillary to 60° C. and BPR to 140° C. R2 was cooled to an internal temperature of 60° C. After reaching the temperature, a solution of 7.22 g (0.011 mol) of dibutyltin dilaurate (DBTL) in 25 ml of dichloromethane was introduced into R2 at a flow rate of 5 nil/min via the HPLC pump. R1 was then heated to an internal temperature of 125° C. with stirring at 50 rpm and, after reaching the temperature, gaseous formaldehyde was introduced into R2 over 5 h. The $CO_2$ feed was then interrupted, the bridge closed off and R1 was cooled to 25° C. A solution of 57.05 g (0.50 mol) of glutaric anhydride in 100 ml of dichloromethane was introduced into R2, with stirring at 400 rpm, at a flow rate of 10 ml/min using the HPLC pump. After addition was complete, the internal temperature in R2 was increased to 100° C. and the reaction mixture was stirred at 400 rpm at this temperature for 18 h. The pressure was then released and R1 and R2 were cooled to 25° C. The weight loss in R1 was 89.16 g. 655.42 g of a yellow viscous oil with colorless solid particles were found in R2. The product was diluted with 100 ml of chloroform and filtered through a paper filter. After the volatile components of the filtrate had been removed under reduced pressure, 463.27 g of a clear, yellow oil were obtained.

By gel permeation chromatography (GPC) against polystyrene standards, a number-average molecular weight $M_n$=2091 g/mol and a polydispersity index PDI=1.35 were determined.

Viscosity: 0.52 Pa·s

Two decomposition stages were identified by thermogravimetric analysis (TGA):

stage 1: decomposition temperature 142.40° C., relative weight loss 6.80%.

stage 2: decomposition temperature 379.64° C., relative weight loss 80.28%.

To determine the 1st decomposition stage, a horizontal evaluation method was applied.

Acid number: 52.6 $mg_{KOH}$/g. From this an average molecular weight M.W.=2129 g/mol is derived.

$^1$H-NMR spectroscopy (400 MHz, $CDCl_3$): δ=0.82-0.99 (m, 2.49H), 0.99-1.23 (m, 86.73H, PE-$CH_3$), 1.23-1.39 (m, 7.90H, PEC-$CH_3$), 1.48 (d, J=6.0 Hz, 2.29H, cPC-$CH_3$), 1.87-1.99 (m, 3.91H, Gt-$CH_2$), 2.32-2.47 (m, 8.00H, Gt-C(O)$CH_2$), 3.17-3.79 (m, 87.29H, PE-CH/PE-$CH_2$/PEC-$CH_2$), 3.81-3.95 (m, 1.97H), 4.02 (dd, J=8.2 Hz, 1.01H, cPC-$CH_2$), 4.57 (dd, J=7.5 Hz, 0.72H, cPC-$CH_2$), 4.69-4.94 (m, 5.62H, $OCH_2$O/PEC-CH/cPC-CH), 5.13 (s, 3.09H, $OCH_2$O), 5.27 (s, 0.11H, $OCH_2$O), 5.27-5.39 (m, 3.14H, $OCH_2$O) ppm.

The average empirical formula according to $^1$H-NMR spectroscopy is Gt-O-$PE_{28.91}$-$PEC_{2.63}$-$(CH_2O)_{4.29}$-Gt. The product therefore comprises an average of 4.29 oxymethylene groups per molecule.

The average molecular weight according to $^1$H-NMR spectroscopy is 2323 g/mol.

$^{13}$C-APT-NMR spectroscopy (100 MHz, $CDCl_3$): δ=13.0 (−), 13.6 (−), 16.2 (−), 16.6 (−), 16.7 (−), 16.8 (−), 17.1 (−), 17.5 (−), 17.6 (−), 17.9 (−), 18.1 (−), 18.8 (−), 19.2 (+), 19.3 (+), 19.4 (+), 19.5 (+), 19.6 (+), 22.1 (+), 24.3 (+), 24.5 (+), 25.7 (+), 26.1 (+), 28.6 (+), 28.8 (+), 29.0 (+), 29.1 (+), 31.3 (+), 32.1 (+), 32.3 (+), 32.6 (+), 32.8 (+), 32.9 (+), 33.3 (+), 65.1 (−), 66.6 (−), 66.7 (−), 70.1 (+), 72.4 (+), 72.6 (+), 72.7 (+), 72.9 (−), 73.2 (−), 73.3 (−), 73.9 (−), 73.9 (−), 74.4 (−), 74.5 (−), 74.6 (−), 74.8 (−), 74.8 (−), 74.9 (−), 76.0 (−), 76.0 (−), 84.3 (+, O—$CH_2$—O), 84.9 (+, O—$CH_2$—O), 87.8 (+, O—$CH_2$—O), 88.5 (+, O—$CH_2$—O), 88.8 (+, O—$CH_2$—O), 89.3 (+, O—$CH_2$—O), 89.6 (+, O—$CH_2$—O), 90.0 (+, O—$CH_2$—O), 90.1 (+, O—$CH_2$—O), 91.7 (+, O—$CH_2$—O), 92.9 (+, O—$CH_2$—O), 153.7 (+, C=O, PEC), 153.8 (+, C=O, PEC), 154.2 (+, C=O, PEC), 154.3 (+, C=O, PEC), 171.6 (+), 171.7 (+), 171.8 (+), 175.0 (+), 175.2 (+) ppm.

Both in the $^1$H- and in the $^{13}$C-NMR spectrum, signals were observed for polyethercarbonate groups (PEC) and oxymethylene groups ($OCH_2$O). The occurrence of a multitude of signals in the $^1$H NMR spectrum in the range of 4.4 to 5.2 ppm, and a multitude of signals having positive polarity in the $^{13}$C APT NMR spectrum in the range of 84.3 to 92.9 ppm, shows the presence of chemically nonequivalent oxymethylene groups in ($CH_2O$), blocks having different chain lengths. The occurrence of carbonate signals in the $^{13}$C-APT-NMR spectrum at 153 to 155 ppm shows the presence of polyethercarbonate units.

IR spectroscopy: ν=2971 (vw), 2930 (w), 2896 (w), 2869 (w), 1811 (w, ν[C=O; cPC]), 1737 (m, ν[C=O]; PEC), 1617 (vw), 1453 (w), 1373 (w), 1345 (vw), 1296 (vw), 1262 (w), 1094 (s), 1012 (w), 968 (w), 928 (vw), 865 (vw), 776 (vw), 734 (vw), 524 (vw) $cm^{-1}$.

The IR spectrum is neither identical to the IR spectrum of paraformaldehyde nor to the IR spectrum of PET-1. The band at 1737 $cm^{-1}$ shows the presence of polyethercarbonate blocks. The occurrence of a band at 968 $cm^{-1}$ indicates the presence of oxymethylene groups.

Both the NMR and the IR spectroscopic data demonstrate beyond doubt the composition of the product from polyethercarbonate and polyoxymethylene blocks.

Inventive Example 2 verifies the preparation of a carboxyfunctional poly(oxypropylene)carbonate-polyoxymethylene block copolymer, in which the preparation of the polyethercarbonate block and the preparation of the polyoxymethylene block took place successively in the same reaction vessel without intermediate purification of the polyethercarbonate.

Comparative Example 1: Thermal Stability of Polyoxymethylene Homopolymers

The thermal stability of paraformaldehyde as a representative of oligomeric polyoxymethylene homopolymers was investigated by thermogravimetric analysis (TGA). Two decomposition stages were determined:

stage 1: decomposition temperature 128.87° C., relative weight loss 61.83%.

stage 2: decomposition temperature 155.38° C., relative weight loss 16.38%.

The comparison of Example 1 and 2 to comparative example 1 shows that the inventive polyethercarbonate-polyoxymethylene block copolymers have an increased thermal stability compared to oligomeric polyoxymethylene homopolymers. For instance, the inventive polyethercarbonate block copolymers obtained in Example 1 and 2 have higher decomposition temperatures than the oligomeric polyoxymethylene homopolymer investigated in comparative example 1, both in the first and in the second decomposition stages (144.83 or 142.40° C. respectively compared to 128.87° C. in the first stage, and 341.54 or 379.64° C. respectively compared to 155.38° C. in the second stage). Furthermore, the inventive polyethercarbonate block copolymers obtained in Example 1 and 2 suffer a much lower relative weight loss in the first decomposition stage than the polyoxymethylene homopolymer investigated in comparative example 1 (11.06 or 6.8% respectively compared to 61.83% weight loss in stage 1).

Example 3: Reaction of the Bicarboxy-Functional Poly(Oxypropylene)Carbonate-Polyoxymethylene Block Copolymer Obtained in Example 2 with Phenyl Glycidyl Ether 50 g of the bicarboxy-functional poly(oxypropylene)carbonate-polyoxymethylene block copolymer obtained in example 2 were weighed into a glass flask together with 14.06 g (97.2 mmol) of phenyl glycidyl ether and 0.25 g (0.94 mmol) of triphenylphosphine, and the mixture was stirred at 80° C. under reflux for 18 h, in the course of which the mixture changed color from yellow to orange. The product was used further as obtained.

OH number: 38.3 $mg_{KOH}$/g. A number-average molecular weight of 2924 g/mol is thereby derived.

The OH number shows that the reaction of the carboxy-terminated poly(oxypropylene)carbonate-polyoxymethylene block copolymer with phenyl glycidyl ether to give a hydroxy-terminated polyoxymethylene block copolymer was successful.

$^1$H-NMR spectroscopy (400 MHz, CDCl$_3$): δ=0.79-0.98 (m, 2.59H), 0.98-1.19 (m, 86.81H, PE-CH$_3$), 1.92-1.30 (m, 6.60H, PEC-CH$_3$), 1.45 (d, J=6.4 Hz, 2.00H, cPC-CH$_3$), 1.88-1.99 (m, 3.88H, Gt-CH$_2$), 2.32-2.45 (m, 8.00H, Gt-C(O)CH$_2$), 2.71-2.32 (m, 1.02H), 2.87 (t, J=4.4 Hz, 1.05H), 3.23-3.75 (m, 87.93H, PE-CH/PE-CH$_2$/PEC-CH$_2$), 3.75-3.78 (m, 2.07H), 3.87-3.95 (kb, 4.95H, PGE-CH$_2$/cPC-CH$_2$), 4.08-4.31 (kb, 5.39H, PGE-CH/PGE-CH$_2$), 4.51 (dd, J=8.1 Hz, 0.64H, cPC-CH$_2$), 4.71-4.91 (m, 4.91H, PEC-CH/cPC-CH/OCH$_2$O), 5.12 (s, 1.53H, OCH$_2$O), 5.18-5.21 (m, 0.37H, OCH$_2$O), 5.27 (s, 2.42H, OCH$_2$O), 5.29-5.38 (m, 2.34H, OCH$_2$O), 6.84-6.96 (m, 7.55H, PGE-CH$_{ar}$), 7.21-7.28 (m, 5.49H, PGE-CH$_{ar}$) ppm.

The $^1$H-NMR spectrum shows new signals in the range of 3.87-4.31 ppm and in the aromatic range (6.84-7.28 ppm), which indicate the incorporation of phenyl glycidol ether in the form of 2-hydroxy-3-phenoxypropyloxy groups PhO—CH$_2$—CH(OH)—CH$_2$—O— (assigned as PGE-CH$_2$ or PGE-CH). For the relative proportion of PGE groups, $n_{PGE}$=[$I_{PGE-CH}$+$I_{PGE-CH2}$−$I_{cPC-CH3}$/3]/5=1.93 holds true. Therefore, $n_{Gt}$:$n_{PGE}$=1.04. This shows that 96% of the glutarate end groups have reacted with phenyl glycidyl ether.

The average empirical formula according to $^1$H-NMR spectroscopy is PGE-Gt-O-PE$_{28.94}$-PEC$_{2.20}$-(CH$_2$O)$_{4.35}$-Gt-PGE. Therefore, no essential change to the proportion of PEC and CH$_2$O is observed in relation to the empirical formula of the product from Example 2.

The average molecular weight according to $^1$H-NMR spectroscopy is 2583 g/mol.

$^{13}$C-APT-NMR spectroscopy (100 MHz, CDCl$_3$): δ=17.2 (−), 17.4 (−), 17.5 (−), 17.7 (−), 18.1 (−), 18.3 (−), 18.5 (−), 19.5 (−), 19.8 (+), 19.9 (+), 20.1 (+), 20.1 (+), 22.7 (+), 25.0 (+), 25.1 (+), 29.4 (+), 29.6 (+), 31.9 (+), 32.8 (+), 33.0 (+), 33.1 (+), 33.3 (+), 44.7 (+), 50.2 (−), 65.5 (+), 66.2 (+), 68.4 (−), 68.6 (+), 68.7 (+), 70.6 (+), 72.9 (+), 72.9 (+), 73.0 (+), 73.4 (+), 74.5 (+), 74.9 (−), 75.0 (−), 75.1 (−), 75.4 (−), 75.4 (−), 75.8 (+), 75.9 (+), 84.5 (+, O—CH$_2$—O), 84.9 (+, O—CH$_2$—O), 85.6 (+, O—CH$_2$—O), 88.5 (+, O—CH$_2$—O), 88.7 (+, O—CH$_2$—O), 89.7 (+, O—CH$_2$—O), 90.9 (+, O—CH$_2$—O), 92.3 (+, O—CH$_2$—O), 93.0 (+, O—CH$_2$—O), 93.1 (+, O—CH$_2$—O), 93.6 (+, O—CH$_2$—O), 114.6 (−), 114.7 (−), 121.2 (−), 121.3 (−), 129.5 (−), 129.6 (−), 158.3 (+, C═O, PEC) ppm.

IR spectroscopy: ν=3449 (b, w ν[OH]), 2970 (w), 2931 (w), 2869 (w), 1808 (w, ν[C═O; cPC]), 1737 (m, ν[C═O]; PEC), 1600 (w), 1496 (vw), 1453 (w), 1373 (w), 1343 (vw), 1296 (vw), 1244 (w), 1096 (s), 1014 (w), 928 (vw), 862 (vw), 814 (vw), 755 (w), 735 (vw), 692 (vw) cm$^{-1}$.

Example 4: Reaction of the Bicarboxy-Functional Poly(Oxypropylene)Carbonate-Polyoxymethylene Block Copolymer Obtained in Example 2 with Isocyanate 1

A glass beaker was initially charged with 10 g of the bicarboxy-functional poly(oxypropylene)carbonate-polyoxymethylene block copolymer obtained in example 2, 0.5 mL of water and 20 mg (0.032 mmol) of DBTL, and the mixture was heated to 60° C. Subsequently, 1.21 g of isocyanate 1 were added while stirring and the mixture was stirred vigorously for 15 s, wherein the mixture hardened. A colorless, non-transparent, glass-like solid was obtained.

Examples 3 and 4 verify the reaction of a carboxy-functional poly(oxypropylene)carbonate-polyoxymethylene block copolymer with epoxides or isocyanates.

Example 5: Reaction of the Bihydroxy-Functional Poly(Oxypropylene)Carbonate-Polyoxymethylene Block Copolymer Obtained in Example 3 with Isocyanate 1

A glass beaker was initially charged with 10 g of the bihydroxy-functional poly(oxypropylene)carbonate-polyoxymethylene block copolymer obtained in example 2, 0.5 mL of water and 20 mg (0.032 mmol) of DBTL, and the mixture was heated to 60° C. Subsequently, 1.21 g of isocyanate 1 were added while stirring and the mixture was stirred vigorously for 15 s, wherein the mixture hardened. A yellowish, non-transparent, glass-like solid was obtained.

Example 5 verifies the reaction of a hydroxy-functional poly(oxypropylene)carbonate-polyoxymethylene block copolymer with isocyanates.

Example 6: Preparation of a Poly(Oxypropylene)Carbonate Diol and Conversion to a Bicarboxy-Functional Poly(Oxypropylene)Carbonate-Polyoxymethylene Block Copolymer R1 was charged with 179.39 g (5.98 mol) of paraformaldehyde, 3.93 g (0.012 mol) of 4-dodecylbenzenesulfonic acid, 3.32 g (0.011 mol) of phosphorus pentoxide and 101.09 g of paraffin. R2 was charged with 252.30 g of PET-1 and 0.103 g of DMC catalyst. The BPR was set to a nominal pressure of 1 bar and the reactor was purged for 10 min with nitrogen with gas outlet open. R2 was then evacuated at 50 mbar pump vacuum using a diaphragm pump and the reactor was heated to an internal temperature of 130° C. After reaching the temperature, the evacuation was continued for 30 min. The link to the vacuum pump was then interrupted, the BPR set to 20 bar and R2 was charged with $CO_2$ at $\dot{m}_{CFC2}$=500 g/h until this value was reached. 3 pulses of 25 g (0.43 mol) of propylene oxide were then introduced into R2 at $\dot{m}_{CFC3}$=60 g/h with stirring at 700 rpm, in which case, after each pulse, the drop in pressure was compensated for by metered addition of $CO_2$, and, prior to each further addition of propylene oxide, there was a waiting period until no further pressure drop was observed. After the reaction of the third propylene oxide pulse had subsided (no further drop in pressure observed), the pressure in R2 was adjusted with $CO_2$ to 20 bar and the internal temperature in R2 was reduced to 100° C. The bridge before the absorber was heated to 140° C. while absorber and connecting line to R2 were heated to 120° C., gas outlet capillary to 60° C. and BPR to 140° C. R1 was then pressurized with $CO_2$ at $\dot{m}_{in,R1}$=500 g/h to a pressure of 20.5 bar. After the pressure had been reached, the mass flow $\dot{m}_{in,R1}$ was reduced to 300 g/h, the bridge between R1 and R2 was opened and R1 was heated to an internal temperature of 125° C. while stirring at 200 rpm. While stirring at 1000 rpm, gaseous formaldehyde was now introduced into R2 over 2 hours. The $CO_2$ feed was then interrupted, the bridge closed off and R1 was cooled to 25° C. A total of 25 g (0.43 mol) of propylene oxide at $\dot{m}_{CFC3}$=60 g/h was introduced into R2 at 100° C. After the addition had ended, the reaction mixture was stirred at 400 rpm at 100° C. for 18 h. The pressure in R2 was then released. The weight loss in R1 during the reaction was 42.97 g and the weight increase in R2 was in total 111.16 g. Deducting the propylene oxide added, this results in a formaldehyde incorporation of 11.16 g (0.37 mol) of formaldehyde. A slightly rose-colored oil with colorless solid particles was found in R2. The product was diluted with 100 ml of chloroform and filtered through a paper filter. After the volatile components of the filtrate had been removed under reduced pressure, 335.75 g of a clear, slightly rose-colored oil were obtained.

By gel permeation chromatography (GPC) against polystyrene standards, a number-average molecular weight $M_n$=1282 g/mol and a polydispersity index PDI=1.17 were determined.

OH number: 80.6 mg$_{KOH}$/g. An average molecular weight of 1390 g/mol is thereby derived.

$^1$H-NMR spectroscopy (400 MHz, CDCl$_3$): δ=0.91-0.97 (m, 0.53H), 0.98-1.20 (m, 97.13H, PE-CH$_3$), 1.20-1.31 (m, 3.37H, PEC-CH$_3$), 1.46 (d, J=6.2 Hz, 4.83H, cPC-CH$_3$), 2.27 (s, 1.00H), 3.07-3.94 (m, 101.33H, PE-CH/PE-CH$_2$/PEC-CH$_2$), 3.99 (t, J=7.7 Hz, 1.65H, cPC-CH$_2$), 4.52 (t, J=7.7 Hz, 1.50H, cPC-CH$_2$), 4.65-4.91 (m, 3.85H, OCH$_2$O/PEC-CH/cPC-CH), 5.12 (s, 1.47H, OCH$_2$O) ppm.

According to $^1$H-NMR spectroscopy, the ratio PE:PEC:(CH$_2$O) in the product is 28.91:1.00:1.16. A molecular weight of 1390 g/mol (determined from the OH number) results in an average empirical formula of HO-PE$_{21.97}$-PEC$_{0.76}$-(CH$_2$O)$_{0.88}$—H.

Therefore, polyethercarbonate-polyoxymethylene block copolymers are present in the product mixture.

$^{13}$C-APT-NMR spectroscopy (100 MHz, CDCl$_3$): δ=16.4 (−), 16.5 (−), 16.6 (−), 17.3 (−), 17.4 (−), 17.7 (−), 17.9 (−); 18.2 (−), 18.5 (−), 64.7 (−), 65.2 (−), 65.9 (−), 69.7 (+), 72.1 (+), 72.4 (+), 72.6 (−); 72.8 (+), 73.0 (+), 73.7 (+), 73.8 (+), 73.9 (−), 74.0 (−), 74.1 (−), 74.2 (−), 74.4 (−), 74.5 (−), 74.6 (+), 74.7 (+), 74.9 (+), 75.0 (+), 75.3 (−), 75.4 (−), 76.3 (+), 76.4 (+), 88.9 (+, O—CH$_2$—O), 89.5 (+, O—CH$_2$—O), 90.9 (+, O—CH$_2$—O), 90.9 (+, O—CH$_2$—O), 91.0 (+, O—CH$_2$—O), 92.5 (+, O—CH$_2$—O), 93.3 (+, O—CH$_2$—O), 93.5 (+, O—CH$_2$—O), 153.8 (+, C=O, PEC), 153.9 (+, C=O, PEC) ppm.

The occurrence of a multitude of signals in the $^1$H NMR spectrum in the range of 4.2 to 5.7 ppm, and a multitude of signals having positive polarity in the $^{13}$C APT NMR spectrum in the range of 85.3 to 92.6 ppm, shows the presence of chemically nonequivalent oxymethylene groups in (CH$_2$O)$_n$ blocks having different chain lengths. The occurrence of carbonate signals in the $^{13}$C-APT-NMR spectrum at 153.8 and 153.9 ppm shows the presence of polyethercarbonate units.

IR spectroscopy: ν=3484 (b, w ν[OH]), 2970 (vw), 2930 (w), 2896 (w), 2869 (w), 1804 (m, ν[C=O; cPC]), 1743 (w, ν[C=O]; PEC), 1451 (w), 1373 (w), 1345 (m), 1297 (vw), 1262 (w), 1093 (s), 967 (vw), 926 (w), 839 (vw), 775 (vw), 712 (vw), 662 (vw), 638 (vw), 524 (vw) cm$^{-1}$.

The IR spectrum is neither identical to the IR spectrum of paraformaldehyde nor to the IR spectrum of PET-1. The band at 1743 cm$^{-1}$ shows the presence of polyethercarbonate blocks. The occurrence of a band at 967 cm$^{-1}$ indicates the presence of oxymethylene units.

Example 7: Preparation of a Poly(Oxypropylene)Carbonate Diol and Conversion to a Bihydroxy-Functional Poly(Oxypropylene)Carbonate-Polyoxymethylene Block Copolymer R1 was charged with 169.41 g (5.65 mol) of paraformaldehyde, 4.00 g (0.012 mol) of 4-dodecylbenzenesulfonic acid, 3.31 g (0.011 mol) of phosphorus pentoxide and 103.41 g of paraffin. R2 was charged with 251.00 g of PET-1 and 0.157 g of DMC catalyst. The BPR was set to a nominal pressure of 1 bar and the reactor was purged for 10 min with nitrogen with gas outlet open. R2 was then evacuated at 50 mbar pump vacuum using a diaphragm pump and the reactor was heated to an internal temperature of 130° C. After reaching the temperature, the evacuation was continued for 30 min. The link to the vacuum pump was then interrupted, the BPR set to 20 bar and R2 was charged with $CO_2$ at $\dot{m}_{CFC2}$=500 g/h until this value was reached. 3 pulses of 25 g (0.43 mol) of propylene oxide were then introduced into R2 at $\dot{m}_{CFC3}$=60 g/h with stirring at 1000 rpm, in which case, after each pulse, the drop in pressure was compensated for by metered addition of $CO_2$, and, prior to each further addition of propylene oxide, there was a waiting period until no further pressure drop was observed. After the reaction of the third propylene oxide pulse had subsided (no further drop in pressure observed), the pressure in R2 was adjusted with $CO_2$ to 20 bar and the internal temperature in R2 was reduced to 100° C. The bridge before the absorber was heated to 140° C. while absorber and connecting line to R2 were heated to 120° C., gas outlet capillary to 60° C. and BPR to 140° C. R1 was then pressurized with $CO_2$ at $\dot{m}_{in,R1}$=500 g/h to a pressure of 20.5 bar. After the pressure had been reached, the mass flow $\dot{m}_{in,R1}$ was reduced to 300 g/h, the bridge between R1 and R2 was opened and R1 was heated to an internal temperature of 125° C. while stirring at 200 rpm. While stirring at 1000 rpm, gaseous formaldehyde was now introduced into R2 over 2 hours. The $CO_2$ feed was then interrupted, the bridge closed off and R1 was cooled to 25° C. A total of 25 g (0.43 mol) of propylene oxide at $\dot{m}_{CFC3}$=60 g/h were introduced into R2 at 100° C. After completion of the addition, the reaction mixture was stirred at 100° C. for a further 18 h. The pressure in R2 was then released. The weight loss in R1 during the reaction was 43.51 g and the weight increase in R2 was in total 113.18 g. Deducting the propylene oxide added, this results in a formaldehyde incorporation of 13.8 g (0.46 mol) of formaldehyde. A slightly rose-colored oil with colorless solid particles was found in R2. The product was diluted with 100 ml of chloroform and filtered through a paper filter. After the volatile components of the filtrate had been removed under reduced pressure, 345.63 g of a clear, slightly rose-colored oil were obtained.

By gel permeation chromatography (GPC) against polystyrene standards, a number-average molecular weight $M_n$=1453 g/mol and a polydispersity index PDI=1.12 were determined.

OH number: 80.2 mg$_{KOH}$/g. A number-average molecular weight of 1397 g/mol is thereby derived.

$^1$H-NMR spectroscopy (400 MHz, CDCl$_3$): δ=0.90-0.99 (m, 0.43H), 0.99-1.22 (m, 57.66H, PE-CH$_3$), 0.1.22-1.39 (m, 3.95H, PEC-CH$_3$), 1.46 (d, J=6.3 Hz, 1.11H, cPC-CH$_3$), 2.34-2.40 (m, 0.39H), 2.65-2.72 (m, 0.40H), 2.88-2.99 (m, 0.52H), 3.07-3.96 (m, 61.50H, PE-CH/PE-CH$_2$/PEC-CH$_2$), 4.01 (t, J=7.5 Hz, 0.44H, cPC-CH$_2$), 4.57 (t, J=8.1 Hz, 0.26H, cPC-CH$_2$), 4.66-4.78 (m, 0.51H, OCH$_2$O), 4.78-4.94 (m, 1.52H, OCH$_2$O/PEC-CH/cPC-CH), 5.01-5.08 (m, 0.15H, OCH$_2$O), 5.11 (s, 1.00H, OCH$_2$O) ppm.

According to $^1$H-NMR spectroscopy, the ratio PE:PEC:(CH$_2$O) in the product is 25.63:1.76:1.00. A molecular weight of 1397 g/mol (determined from the OH number) results in an average empirical formula of HO-PE$_{22.55}$-PEC$_{1.55}$-(CH$_2$O)$_{0.88}$—H.

Therefore, polyethercarbonate-polyoxymethylene block copolymers are present in the product mixture.

$^{13}$C-APT-NMR spectroscopy (100 MHz, CDCl$_3$): δ=16.3 (−), 16.4 (−), 16.6 (−), 16.7 (−), 17.3 (−), 17.5 (−), 17.8 (−), 17.9 (−), 18.2 (−), 18.6 (−), 46.8 (+), 47.0 (−), 64.7 (−), 64.8 (−), 66.0 (−), 66.0 (−), 69.7 (+), 72.2 (+), 72.5 (+), 72.8 (−), 73.1 (+), 73.9 (+), 73.9 (+), 74.2 (−), 74.3 (−), 74.4 (−), 74.6 (−), 74.7 (+), 74.9 (+), 75.0 (+), 75.1 (+), 75.4 (−), 75.5 (−), 76.3 (+), 76.5 (+), 85.3 (+, O—CH$_2$—O), 86.1 (+, O—CH$_2$—O), 86.7 (+, O—CH$_2$—O), 86.8 (+, O—CH$_2$—O), 88.3 (+, O—CH$_2$—O), 88.8 (+, O—CH$_2$—O), 89.2 (+, O—CH$_2$—O), 89.8 (+, O—CH$_2$—O), 90.5 (+, O—CH$_2$—O), 92.6 (+, O—CH$_2$—O), 153.8 (+, C=O, PEC), 153.9 (+, C=O, PEC) ppm.

The occurrence of a multitude of signals in the $^1$H NMR spectrum in the range of 4.2 to 5.7 ppm, and a multitude of signals having positive polarity in the $^{13}$C APT NMR spectrum in the range of 85.3 to 92.6 ppm, shows the presence of chemically nonequivalent oxymethylene groups in (CH$_2$O)$_n$ blocks having different chain lengths. The occurrence of carbonate signals in the $^{13}$C-APT-NMR spectrum at 153.8 and 153.9 ppm shows the presence of polyethercarbonate units.

IR spectroscopy: ν=3466 (b, w ν[OH]), 2969 (vw), 2930 (w), 2869 (w), 1813 (m, ν[C=O; cPC]), 1743 (w, ν[C=O]; PEC), 1451 (w), 1372 (w), 1343 (m), 1296 (vw), 1262 (w), 1094 (s), 1014 (w), 968 (vw), 925 (w), 863 (w), 825 (vw) cm$^{-1}$.

The IR spectrum is neither identical to the IR spectrum of paraformaldehyde nor to the IR spectrum of PET-1. The band at 1743 cm$^{-1}$ shows the presence of polyethercarbonate blocks. The occurrence of a band at 968 cm$^{-1}$ indicates the presence of oxymethylene units.

Inventive Examples 6 and 7 verify the preparation of product mixtures comprising poly(oxypropylene)carbonate-polyoxymethylene block copolymers, in which the preparation of the polyethercarbonate block and the preparation of the polyoxymethylene block took place successively in the same reaction vessel without intermediate purification of the polyethercarbonate and the catalyst for the preparation of the polyethercarbonate block is identical to the catalyst for the preparation of the polyoxymethylene block.

The invention claimed is:

1. A process for preparing polyethercarbonate-polyoxymethylene block copolymers, comprising polymerizing formaldehyde in the presence of a polyethercarbonate having at least one Zerewitinoff-active hydrogen atom, wherein the polymerizing is effected in the presence of one or more comonomers so that polyoxymethylene units are linked to the polyethercarbonates via one or more comonomers and/or polyoxymethylene units are linked to one another via one or more comonomers.

2. The process of claim 1, wherein the formaldehyde is polymerized also in the presence of a catalyst.

3. The process of claim 1 wherein the formaldehyde is introduced into a reaction vessel as gaseous formaldehyde.

4. The process of claim 1, wherein the polymerization of formaldehyde takes place in a reaction vessel and wherein the polyethercarbonate used to prepare the polyethercarbonate-polyoxymethylene block copolymers is prepared prior to the polymerization of the formaldehyde in the same reaction vessel in which the polymerization of formaldehyde takes place and without purification steps therebetween.

5. The process of claim 1, wherein the polyethercarbonate used to prepare the polyethercarbonate-polyoxymethylene block copolymers is prepared from starting materials comprising an epoxide and carbon dioxide.

6. The process of claim 1, wherein the one or more comonomers comprises a cyclic ether, a cyclic acetal, a cyclic ester, a cyclic acid anhydride, or a mixture of two or more thereof.

7. The process of claim 6, wherein the one or more comonomers comprises an epoxide, a cyclic acetal, and/or a cyclic ester.

8. The process of claim 6, wherein the one or more comonomers comprises ethylene oxide, propylene oxide, 1,3-dioxolane, 1,3-dioxepane, and/or ε-caprolactone.

* * * * *